US007234116B2

(12) United States Patent
Watanabe et al.

(10) Patent No.: US 7,234,116 B2
(45) Date of Patent: Jun. 19, 2007

(54) COMMUNICATIONS SYSTEM FOR TRANSMITTING, RECEIVING, AND DISPLAYING AN IMAGE AND ASSOCIATED IMAGE ACTION INFORMATION

(75) Inventors: Kimihito Watanabe, Suita (JP); Takafumi Maruyama, Suita (JP)

(73) Assignee: Qript, Inc., Osaka-shi (JP)

( * ) Notice: Subject to any disclaimer, the term of this patent is extended or adjusted under 35 U.S.C. 154(b) by 1115 days.

(21) Appl. No.: 10/066,564

(22) Filed: Feb. 6, 2002

(65) Prior Publication Data

US 2002/0186232 A1    Dec. 12, 2002

(30) Foreign Application Priority Data

Jun. 11, 2001    (JP)    ............................. 2001-176100

(51) Int. Cl.
*G06F 3/00*    (2006.01)
(52) U.S. Cl. ...................... 715/758; 715/752; 715/753; 715/759
(58) Field of Classification Search .................... None
See application file for complete search history.

(56) References Cited

U.S. PATENT DOCUMENTS

| | | | | |
|---|---|---|---|---|
| 4,430,639 A | * | 2/1984 | Bennett et al. | ............. 340/10.6 |
| 5,613,056 A | * | 3/1997 | Gasper et al. | ............... 345/473 |
| 5,754,778 A | | 5/1998 | Shoujima | |
| 6,181,351 B1 | * | 1/2001 | Merrill et al. | ............... 345/473 |
| 6,240,443 B1 | * | 5/2001 | Suzuki et al. | ................ 709/204 |
| 6,311,195 B1 | | 10/2001 | Hachiya et al. | |
| 6,430,602 B1 | * | 8/2002 | Kay et al. | .................... 709/206 |
| 6,476,815 B1 | * | 11/2002 | Ando | ......................... 345/473 |
| 6,636,219 B2 | * | 10/2003 | Merrick et al. | ............. 345/473 |
| 2002/0007398 A1 | * | 1/2002 | Mendiola et al. | ........... 709/206 |
| 2002/0026483 A1 | * | 2/2002 | Isaacs et al. | ................. 709/206 |
| 2002/0161582 A1 | * | 10/2002 | Basson et al. | .............. 704/260 |
| 2003/0011643 A1 | * | 1/2003 | Nishihata | ..................... 345/810 |
| 2003/0016639 A1 | * | 1/2003 | Kransmo et al. | ........... 370/335 |
| 2005/0015443 A1 | * | 1/2005 | Levine et al. | ................ 709/204 |

OTHER PUBLICATIONS

Padwick et al, "Using Microsoft Outlook 2000", May 1999, Que, Special Edition, pp. 400-405.*
Microsoft Outlook 2000, "Microsoft Outlook 2000 Screen Caps", Copyright 1999, Microsoft Corp., Figures 1-6.*

* cited by examiner

*Primary Examiner*—Tadesse Hailu
*Assistant Examiner*—Alvin H. Tan
(74) *Attorney, Agent, or Firm*—Oblon, Spivak, McClelland, Maier & Neustadt, P.C.

(57) ABSTRACT

A novel communications system is provided, including a plurality of user terminals capable of communication using a predetermined communication software program and accessible to Internet, and an administrator server on line with Internet, wherein each of the user terminals is capable of transmitting a character message comprising character information for designating a character, action information for designating an action of the character and a text message to another user terminal through Internet via the administrator server with use of the communication software program, while the latter user terminal having received the character message is capable of displaying an image of the character performing the action and the text message on a screen by selecting a motion picture file based on the character information and the action information received using the communication software program and executing the motion picture file.

4 Claims, 34 Drawing Sheets

Fig.12

MESSAGE ADDRESSEE SELECTION

Members capable of communication within the group

○○○@○△□
△△@○△□
□□□@○△□
×××@×△○
◇◇@×△○

→
←

Message addressee members

△△@○△□

Members out of the group

Mail address

User account @ Group name

Message preparation

Cancel

Fig.13

MESSAGE PREPARATION

Title

Enter a message to be transmitted

Hello, I am □◇. (efg.co.jp)

Selection of a character

◯ cat  ◯ dog  others

Selection of a character's action

◯ Thanks  ◯ Sorry  Others

| URL entry section | abc@co.jp | Send | Attachment file section |
| Software program name entry section | XYZ.exe | Cancel | xxx.doc |

Fig.15
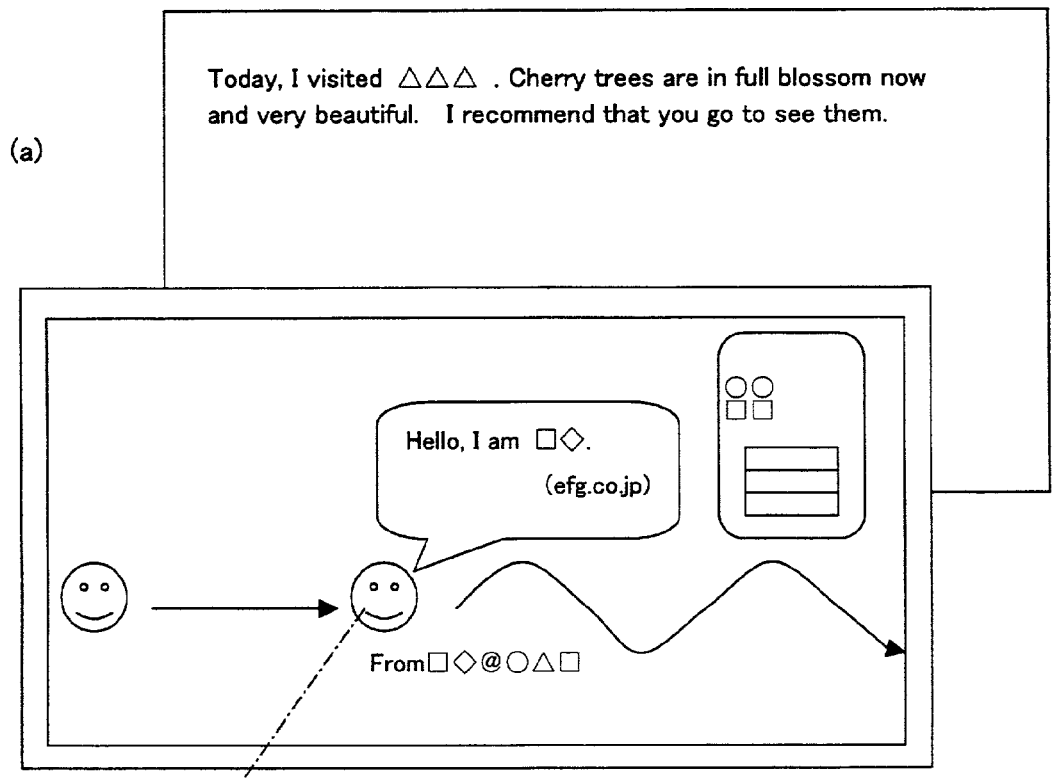
(a)
Clicking on the character causes the desired software program to start up.
- Spreadsheet software
- Word processing software
- Game software
- Browser software
(b)
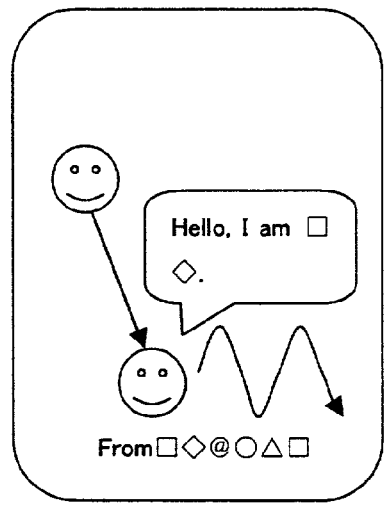

Fig.18

| MESSAGE BOX | | |
|---|---|---|
| Group : ○△□<br>┣ ○○<br>┣ △△<br>┣ □○<br>Group : ○△□<br>┣ ××  | Title | Date |
| | I have not seen you for a long time !<br><br>Next time ... | 06/01/2000<br><br>06/08/2000 |

Fig.20

| MESSAGE ADDRESSEE USER SELECTION |
|---|

|  | User account | | Group name |
|---|---|---|---|
| Member | ☐ | @ | ☐ |
| Mail address | ☐ | | |

- Message preparation
- Cancel

Fig.21

MESSAGE PREPARATION

Title

Enter a message to be transmitted

Selection of a character

○ cat    ○ dog

Selection of a character's action

○ Thanks    ○ Sorry

| Send the message |
| Cancel |

Fig.22

NEW USER REGISTRATION

Fill out the following form with necessary information and then click on the register button.

---

Entry of user information

| | |
|---|---|
| User's name | ☐ |
| Mail address | ☐ |
| Password<br>( not less than 5 characters ) | ☐ |
| Password<br>( again for confirmation ) | ☐ |
| Nickname | ☐ |

※Note : Nickname is a name attached to a message.

| Register | Reset |
|---|---|

Fig.23

USER REGISTRATION CONFIRMATION

Make sure that there is no error in the following information and then click on the register button.
If there is any error, return to the registration page using a back button of the browser, correct the error, and then click on the register button.
A mail will be transmitted to the mail address registered after the confirmation is made.
Wait until the screen changes.

| | |
|---|---|
| Name | ○○○ |
| Mail address | □□@××.co.jp |
| Password | ****** |
| Nickname | ○△□ |

[ Register ]

※Click on the button and wait until the screen changes.

Fig.24

Your user registration has been completed.

User ID : 10245

Name : ○○○

Mail address : □□@××.co.jp

Password : abcde

Nickname : ○△□

Start up the communication software and input the user ID and password mentioned above.

If there is any question, inconvenience, etc., please inquire at △×@qriptone.ne.jp.

It is required that this mail be saved.

Fig.25

| USER REGISTRATION COMPLETED |
|---|
| Your user registration has been completed,and the mail has been transmitted to □□@××.co.jp . If the mail does not reach you in two days, please inquire at △×@qriptone.ne.jp. |

Fig.26

Input user information

User ID

Password

O.K.

If you have not made a user registration, please complete the registration beforehand at http://△□□.qriptone.ne.jp/.

Terminate

Fig.27

GROUP REGISTRATION・CORRECTION

Representative's log-in

Group name

Group password

Log in

New registration

User ID of a representative

User password of the representative

Group name ( in alphanumerics only)

Group password
( not less than 5 characters )

Group password
(again for confirmation )

Register | Reset

Fig.28

NEW GROUP REGISTRATION CONFIRMATION

Make sure that there is no error in the following information and then click on the register button.

If there is any error, return to the registration page using a back button of the browser, correct the error, and then click on the register button .

A mail will be transmitted to the mail address registered after the confirmation is made

| | |
|---|---|
| Representative's name | ○○○ |
| Mail address | □□@××.co.jp |
| Group name | ○△□ |
| Password | ****** |

[Register]

※Click on the button and wait until the screen changes .

Fig.29

Group registration has been completed.

Group ID : 1081

Group Name : ○△□

Group password : abcde

Representative's user ID : 10245

Representative's name : ○○○

Mail address : □□@××.co.jp

Start up the communication software and input the group name to the setting screen.

If there is any question, inconvenience, etc., please inquire at △×@qriptone.ne.jp.

You can alter the group registration or add a user to the group at http://△□□.qriptone.ne.jp/group/

It is required that this mail be saved.

NEW GROUP REGISTRATION COMPLETED

---

New group registration has been completed,
and the mail has been transmitted to
□□@×× .co.jp.
If the mail does not reach you in two days,
please inquire at △×@qriptone.ne.jp.

---

If you wish to add a user to the group thus registered, please click on the user addition button below.

Add the user

Fig.31

GROUP INFORMATION RENEWAL PAGE

Group name : ○△□

Setting of user

Input your account in alphanumertics.
Do not assign the same account to another member of the same group.
Use of the account enables transmission of a message in the form of
" account @ group ".

| User ID | User's name | Mail address | Account | Nickname | | |
|---|---|---|---|---|---|---|
| 10254 | ○○○ | □□@××.co.jp | hogehoge | ◇□○ | Correct | Delete |
| 11865 | △△ | △○@××.co.jp | chome | △□ | Correct | Delete |

Addition of a user to the group

Fill out the following form with necessary information and
the click on the add button.

When clicking is made, the user addition confirmation screen is displayed, and then, as soon as the user is added, a mail will be transmitted to the user added.

User ID to be registered    [　　　　　]

User mail address to be registered    [　　　　　]

Account ( in half-size alphanumerics )    [　　　　　]

Nickname for use within a group    [　　　　　]

※Entry of the mail address of the user to be registered is required for authentication.
If the "Nickname for use within a group" section is left blank, the nickname having been registered upon user registration is used.

[ Add the user ]    [ Reset ]

Fig.32

ADDITIONAL USER CONFIRMATION

| User ID | User's Name | Mail address | Account | Nickname |
|---------|-------------|--------------|---------|----------|
| 12987 | ◇△ | □△@××.co.jp | xyz | ◇◇× |

Addition of this user to the group is O.K.?
If O.K., click on the add button below.
Wait for a while until the screen changes.

Add the user

Fig.33

Group user registration has been completed.

Group ID : 1081

Group Name : ○△□

Your user account : xyz

Your nickname for use within the group : ◇◇ ×

User ID of the representative : 10245

Name of the representative : ○○○

Mail address of the representative : □□@ × ×.co.jp

Start up the communication software and input the group ID to the setting screen.

If there is any question, inconvenience, etc., please inquire at △ × @qriptone.ne.jp.

Fig.34

ADDITIONAL USER REGISTRATION COMPLETED

The group registration has been completed in due course
and a mail has been transmitted to
□△@××.co.jp
If the mail does not reach you in two days, please inquire at
△×@qriptone.ne.jp.

Return to the registration
confirmation page

COMMUNICATIONS SYSTEM FOR TRANSMITTING, RECEIVING, AND DISPLAYING AN IMAGE AND ASSOCIATED IMAGE ACTION INFORMATION

BACKGROUND OF THE INVENTION

1. Field of the Invention

The present invention relates to communications systems utilizing communication channels such as an electronic mail system and a mobile phone system.

2. Description of the Related Art

The number of electronic mail users is rapidly increasing with recent steep proliferation of computers, mobile terminals and mobile phones accessible to Internet.

However, electronic mails are basically in the form of text though they can be attached with images, programs, sound and the like.

With only a text message, it is difficult to convey the nuance of a subject one wishes to say exactly to the other party. The receiver of an electronic mail consisting only of text has to understand the contents of the mail relying only upon letters of the text and, hence, misunderstanding is possible to occur.

In the case of a business transaction through an electronic mail it is sufficient for the electronic mail to transmit specific matters like "delivery of . . . (number) sets of . . . until . . . (fixed date)" and, hence, the contents of the electronic mail can be understood relatively easily by the receiver of the electronic mail.

In the case of everyday communications through an electronic mail, in contrast, text is usually written in a spoken language and, hence, the receiver of the electronic mail has to make effort in understanding what the text of the mail intends to say with the help of imagination because the receiver cannot know stressed points of the text and expressions or gestures of the transmitting side.

Generally, text gives a somewhat hard impression since it gives the receiving side a stronger impression than speech and remains as a record in future. For example, it is possible that even a friendlily written text transmitted through an electronic mail is misunderstood to be disdainful by the receiver of the electronic mail. In this way a subtle difference in usage of words may cause the reader of a text to misunderstand or make the reader unpleasant.

Those familiar with electronic mail use face marks for expressing a laughing face, crying face and the like with a series of letters or symbols such as (^0^) in order to convey the nuance of a written speech or their intention more exactly to a mail receiver and lighten the expression with limited expression means, i.e., letters and symbols.

However, expressions of such face marks consisting of limited letters and symbols are limited and, hence, it is difficult for such face marks to convey diverse intentions and feelings.

Though an image can be attached to an electronic mail, laborious and time-consuming operations are needed to draw a picture using painting software or to capture an image using a digital camera, scanner or the like before the image is attached to the electronic mail. In addition, the image thus attached is a still image and, hence, the expression with a single picture or photo is limited very much.

Although a motion picture can be transmitted as attached to an electronic mail, it takes a very long time to transmit such a motion picture comprising multiplicity of images each having a large amount of image data.

Some mailers (software programs for transmitting and receiving electronic mails) display a character such as a bear or a rabbit that appears to bring an electronic mail to the mail receiver. To utilize such a mailer, it is required that a mail sender and a mail receiver have respective terminals installed with a same version of mailer. Further, the character used in such a mailer merely brings a mail and does not function as means for expressing mail sender's intention.

There is a merit that a mail sender can send an electronic mail whenever the main sender wants it and a mail receiver can read the electronic mail whenever the mail receiver wants it. In another aspect this merit is a demerit because the mail sender is incapable of checking whether the mail receiver has read a mail sent by the mail sender. For this reason, electronic mail insufficiently works as reliable means for transmitting information. In fact, the mail sender becomes worried about whether or not his or her mail reached the main receiver if there is no response from the mail receiver. As is often the case with such a situation, the mail sender cannot but make sure that the mail reached the mail receiver by telephone. Since there is no guarantee that an electronic mail necessarily reaches an intended mail receiver, any means for confirming the receipt of an electronic mail is desired.

Accordingly, it is an object of the present invention to provide a communications system that is capable of transmitting one's intention to a receiving side in diverse expression manners as well as of confirming that the receiving side read the contents transmitted from the transmitting side.

It is another object of the present invention to provide various convenient functions that cannot be achieved by the prior art electronic mailing system.

SUMMARY OF THE INVENTION

According to a first aspect of the present invention, there is provided a communications system, which is configured such that when a transmitting side transmits a character and its action designated by the transmitting side to a receiving side, the designated character performs the designated action on a screen on the receiving side.

The communications system of this configuration is capable of causing a transmitting side's favorite character to perform an action designated by the transmitting side on the screen on the receiving side. With this system the transmitting side becomes capable of expressively conveying feelings that cannot be conveyed with letters.

According to a second aspect of the present invention, there is provided a communications system, which is configured such that when a transmitting side transmits a character message comprising character information for designating a character, action information for designating an action of the character and a text message to a receiving side, a screen on the receiving side having received the character message displays a motion picture of the character together with the text message.

The communications system of this configuration is capable of displaying a text message as well as of causing a transmitting side's favorite character to perform the designated action on the screen on the receiving side. With this system the transmitting side becomes capable of expressively conveying feelings that cannot be sufficiently conveyed with letters only.

The communication system according to the first or second aspect of the present invention is preferably configured such that when the receiving side receives character information for designating a character and action information for designating an action of the character, a file related to the action of the character is selected from information recorded on the receiving side and is executed.

With this configuration, the type of a character and a character's action are specified by the character information and the action information, respectively and, hence, the receiving side is capable of causing the character to perform the action on the screen on the receiving side by executing a file recorded on the receiving side on the basis of the contents thus specified.

In a preferred embodiment, the communications system is configured such that the transmitting side effects a transmission to the receiving side through an administrator server and that when the receiving side does not have the file related to the action of the character, the file is transmitted from the administrator server to the receiving side.

The type of a character and a character's action are specified by the character information and the action information, respectively. However, if the receiving side does not have the file specified, the receiving side has the intermediary administrator server transmit the specified file to the receiving side and then executes the file. Accordingly, even if files related to all actions of every character are not recorded on the receiving side, it is possible to cause a designated character to perform a designated action on the screen on the receiving side.

In another preferred embodiment, the communications system is configured such that communications are performed via an administrator server and that when the receiving side is not ready to receive the character message that is transmitted from the transmitting side via the administrator server, the administrator server converts the text message into an electronic mail, attaches the character information and the action information to the electronic mail as attachments and transmits the electronic mail to the receiving side.

When the receiving side is off-line with Internet or its communication software is not active, the character message transmitted from the transmitting side cannot be executed immediately on the receiving side. In this case the administrator server converts the character message into an electronic mail and its attachments and then transmits them to the receiving side. Thus, the receiving side becomes capable of receiving information in the form of a common electronic mail.

In another preferred embodiment, the communications system is configured such that the character displayed on the receiving side temporarily suspends its action while the text message is being displayed in a message box and then resumes its action after the message box is dismissed.

When the receiving side receives the character message, the character starts performing its action and then temporarily suspends its action. During the suspension of the character's action, the text message is displayed in the message box. When the receiver dismisses the message box after having read the message, the character resumes its action. This means that at a time the character's action is completed, the receiving side has already read the text message. Accordingly, the dismissal of the message box or the subsequent completion of the character's action can form a basis for judging that the receiving side has read the message.

In another preferred embodiment, the communications system is configured such that a receipt confirmation message is automatically transmitted back to the transmitting side when the receiving side checks the contents of the transmission received by the receiving side.

This configuration allows the transmitting side to confirm that the receiving side has checked the contents of the message. Further, since the receipt confirmation message is automatically transmitted back to the transmitting side after the checking of the transmission, there is no possibility of a failure to transmit the confirmation message to the transmitting side.

In another preferred embodiment, the communications system is configured such that a receipt confirmation message is automatically transmitted back to the transmitting side after the text message displayed on the screen on the receiving side is dismissed.

With this configuration, the dismissal of the text message displayed on the receiving side screen can be judged that the receiving side has checked the contents of the text message and, hence, the receipt confirmation message is automatically transmitted back to the transmitting side after the dismissal of the text message. Thus, it is possible to prevent the receipt confirmation message from being automatically transmitted back to the transmitting side before the text message is checked on the receiving side.

According to a third aspect of the present invention, there is provided a communications system, which is configured to allow a terminal of a user utilizing the system to display information on the status of other users previously registered.

With this configuration, a user becomes capable of knowing the status of other users if the user has only to look at the screen of the user's terminal.

Preferably, the information on the status of other users is renewed at a predetermined time interval.

Since the information on the status of other users is renewed at a predetermined time interval, every user can know the status of other users based on the latest information.

Preferably, the communications system is provided with an administrator server which is capable of recording information on the status of a user transmitted from the user as well as of transmitting the information thus recorded to another user in response to a request from the latter user.

Since the administrator server stores information transmitted from users, the server can transmit the information to a user who has made a request for the information on the status of other users.

According to a fourth aspect of the present invention, there is provided a communications system, which is configured to allow a terminal on a receiving side to compare information transmitted from a transmitting side with information provided either randomly or in a predetermined sequence by the receiving side to decide victory or defeat based on a predetermined victory-or-defeat decision condition and then transmit the decision of victory or defeat to the transmitting side.

This configuration is capable of deciding victory or defeat by comparing the information transmitted from the transmitting side with the information provided by the receiving side. Since the information from the receiving side is provided either randomly or in a predetermined sequence, it is possible to prevent a cheat such that the receiving side wins by knowing the information from the transmitting side first and then picking out information surpassing the information from the transmitting side. Thus, this configuration is applicable to a game or the like that calls for simultaneous judgment on information items presented by the two sides.

According to a fifth aspect of the present invention, there is provided a communications system comprising a plurality of user terminals capable of communication using a predetermined communication software program and accessible to Internet, and an administrator server on-line with Internet, wherein each of the user terminals is capable of transmitting a character message comprising character information for designating a character, action information for designating an action of the character and a text message to another user terminal through Internet via the administrator server with use of the communication software program, while said another user terminal having received the character message is capable of displaying an image of the character performing the action and the text message on a screen by selecting a motion picture file based on the character information and the action information received using the communication software program and executing the motion picture file.

The communications system of this configuration allows the character designated by the transmitting side to perform the designated action on a terminal on the receiving side as well as causes the terminal to display the text message together with the character. With this system the transmitting side becomes capable of expressively conveying feelings that cannot be sufficiently conveyed only by means of letters to the receiving side without causing misunderstanding to occur.

Since motion picture information itself is not directly transmitted and received but information for designating a file of the motion picture information is transmitted and received, a less load is imposed on the communication.

Preferably, the user terminal receiving the character message is configured to automatically transmit a receipt confirmation message back to the user terminal on the transmitting side via the administrator server after the text message displayed on the screen on the receiving side is dismissed.

The receipt confirmation message is not transmitted back to the transmitting side until the receiving side user has dismissed the text message; that is, the receipt confirmation message is not transmitted back to the transmitting side unless the receiving side user has read the text message. Since the receipt confirmation message is automatically transmitted back to the transmitting side if the receiving side user has read the text message, reliable receipt confirmation is achieved. The transmitting side user can be relieved to confirm that the receiving side user has read the message when the receipt confirmation message reaches the transmitting side.

According to a sixth aspect of the present invention, there is provided a communications system comprising terminals each of which is capable of using a communication software program for transmitting and receiving a character message comprising character information for designating a character, action information for designating an action of the character and a text message as well as of displaying an image of the character performing the action and the text message on a screen in response to a receipt of the character message.

Preferably, the action information is capable of designating plural actions in a predetermined sequence.

The terminal of each user is capable of transmitting the character message with use of the communication software program, while the terminal of another user receiving the character message is capable of displaying the character performing the designated actions. Since the transmitting side is capable of designating character's actions in any desired sequence, it is possible to further enrich the expression by appropriately setting the sequence of actions.

In a preferred embodiment of the communication system, communications are performed via an administrator server; the terminal on a receiving side is capable of selecting a motion picture file from files recorded in the terminal on the receiving side based on the character information and the action information that are received by the receiving side terminal and executing the motion picture thus selected; and when the motion picture file is not recorded in the receiving side terminal, the receiving side terminal is capable of downloading the motion picture file from the administrator server and executing the motion picture thus downloaded.

With this configuration, even if the motion picture file related to the character's action designated by the transmitting side is not recorded in the receiving side terminal, the motion picture file is automatically downloaded from the administrator server to the receiving side terminal and, hence, the receiving side terminal is capable of displaying the character performing the designated action by executing the motion picture file thus downloaded. Therefore, the receiving side need not hold all the motion picture files beforehand and hence is not required to have a large recording capacity. On the other hand, the transmitting side can transmit the character message without worrying about whether or not the receiving side holds the motion picture file related to the designated character.

According to a seventh aspect of the present invention, there is provided a communications system comprising an administrator server acting as an intermediary in communication among users utilizing the communications system, the administrator server having a user information database in which user status information consisting of information on the current status of each of the users is recorded, and a group management database in which information on users belonging to a group of users are recorded on a group basis, wherein the administrator server is configured such that when the user status information is transmitted from a user to the administrator server, the administrator server accesses the user information database to renew the user status of the user recorded therein, and that when a user transmits a request for the user status information on another user to the administrator server, the administrator server accesses the group management database to extract said another user belonging to a group to which the user making the request belongs, then accesses the user information database to search for the user status of said another user and, thereafter, transmits information on the user status of said another user to the user making the request.

With this configuration, the administrator server is capable of holding information on the latest user status of each user in the user information database. When a user makes a request for the user status information on a member of the group to which the user belongs, the administrator server specifies the member using the group management database and transmits the latest user status information on the member to the user.

In a preferred embodiment of the communications system according to the seventh aspect of the present invention, terminals of the users are each capable of transmitting a request for user status information to the administrator server at a predetermined time interval and displaying the user status of another user belonging to a group to which the user transmitting the request belongs on the screen of the terminal transmitting the request based on the user status information transmitted from the administrator server in response to the request.

With this configuration, each user is capable of obtaining the latest user status information by periodically addressing a request for user status information from his or her terminal to the administrator server. Thus, the latest information on the current status of each member of the same group can be displayed on the screen of each user terminal.

Preferably, the terminals of the users are each capable of transmitting a request for renewal of user status information for latest information to the administrator server at any desired occasion separately from the periodical request for the latest user status information.

With this configuration, a user is capable of obtaining the latest information on the user status of each member of the same group at any desired occasion.

In a preferred embodiment, the user status has two types of attributes including "OnNet" that is an attribute indicative of a state where a user terminal is on-line with Internet while a communication software program of the user terminal is active, and "OffNet" that is an attribute indicative of a state where the user terminal is not in the former state; and when the attribute of the user status is "OnNet", the user terminal is capable of using instead of "OnNet" a user status item selected from a plurality of previously provided user status items or a user status item arbitrarily created by the user while imparting the same attribute as "OnNet" thereto.

With this configuration, it is possible to judge whether or not a member of the same group is ready to receive the character message as well as to know the details of the status of a user by the use of different user status items.

According to an eighth aspect of the present invention, there is provided a communications system comprising an administrator server acting as an intermediary among users in communication of a character message comprising character information for designating a character, action information for designating an action of the character and a text message, the administrator server being configured to record user status consisting of information on the current status of each of the users.

With this configuration, the administrator server can relate the character message to the user status.

In a preferred embodiment, the user status has two types of attributes including "OnNet" that is an attribute indicative of a state where a user terminal is on-line with Internet while a communication software program of the user terminal is active, and "OffNet" that is an attribute indicative of a state where the user terminal is not in the former state; and when the attribute of the user status is "OnNet", the character message from a transmitting side is transmitted as it is to a receiving side via the administrator server, while when the attribute of the user status is "OffNet", the administrator server converts the information from the transmitting side into an electronic mail and then transmits the electronic mail to the receiving side.

Preferably, the administrator server is configured to converts text information included in the information transmitted from the transmitting side into a body of the electronic mail while converting the character information and the action information into attachments attached to the electronic mail and then transmit the electronic mail with the attachments to the receiving side.

With these configurations, the administrator server is capable of judging whether or not the receiving side is ready to look at the character message from the user status of the receiving side user, and transferring the character message to the receiving side only when the receiving side is ready to look at the character message or converting the character message into an electronic mail and then transmitting the electronic mail to the receiving side.

Preferably, the user terminal on the receiving side is capable of reconverting the electronic mail with the attachments into the character message in a state before the conversion into the electronic mail.

Since the character message converted into an electronic mail by the administrator server is reconverted into the character message by means of the communication software program on the receiving side, the user terminal on the receiving side is capable of displaying not only the text message but also the character performing the action.

In a preferred embodiment, any one of the terminals used by the users is a mobile terminal. The communications system of this configuration can be utilized though a mobile phone.

In the communications system according to any one of the foregoing aspects of the present invention, a start-up software program for starting up any desired software program is embedded in at least one of the character and a balloon.

With this configuration, a user is capable of starting up a desired software program by clicking on one of the character and the balloon. If the software program is a browser, the character can be linked to a predetermined homepage so as to be used as an advertising media. If an advertisement related image is used as the character (for example, an image of a hamburger is used as the character by a hamburger company), an enhanced advertising effect can be expected. Alternatively, if the software program is word processing software, spreadsheet software or game software, a user is capable of transmitting a message written as desired by the user (text information or the like), a table or a game.

It should be noted that the term "balloon", as used herein, means an encircled region containing words, speech or thought of a character as typically used in a cartoon.

These and other objects, features and attendant advantages of the present invention will become apparent from the reading of the following detailed description in conjunction with the accompanying drawings.

BRIEF DESCRIPTION OF THE DRAWINGS

FIG. 12 is an illustration of a "message addressee member selecting screen";

FIG. 13 is an illustration of a "message preparation screen";

FIG. 15 is an illustration of examples of character's actions performed upon receipt of a character message;

FIG. 18 is an illustration of a "received transmission box";

FIG. 20 is an illustration of a "message addressee user selecting screen (in the case of an access from a mobile phone)";

FIG. 21 is an illustration of a "message preparation screen (in the case of an access from a mobile phone)";

FIG. 22 is an illustration of a "user registration screen";

FIG. 23 is an illustration of a "user registration confirmation screen";

FIG. 24 is an illustration of a mail notifying the completion of registration;

FIG. 25 is an illustration of a "user registration completion screen";

FIG. 26 is an illustration of a "user information inputting screen";

FIG. 27 is an illustration of a "group registration•correction screen"

FIG. 28 is an illustration of a "new group registration confirmation screen";

FIG. 29 is an illustration of a mail notifying the completion of group registration;

FIG. 30 is an illustration of a "new group registration completion screen";

FIG. 31 is an illustration of a "group information renewal screen";

FIG. 32 is an illustration of an "additional group user confirmation screen";

FIG. 33 is an illustration of a "group user registration completion notifying mail"; and FIG. 34 is an illustration of an "additional user registration completion screen".

DETAILED DESCRIPTION OF THE PREFERRED EMBODIMENTS

The present invention will now be described in detail by way of preferred embodiments thereof with reference to the accompanying drawings.

System Configuration

Figure 1:
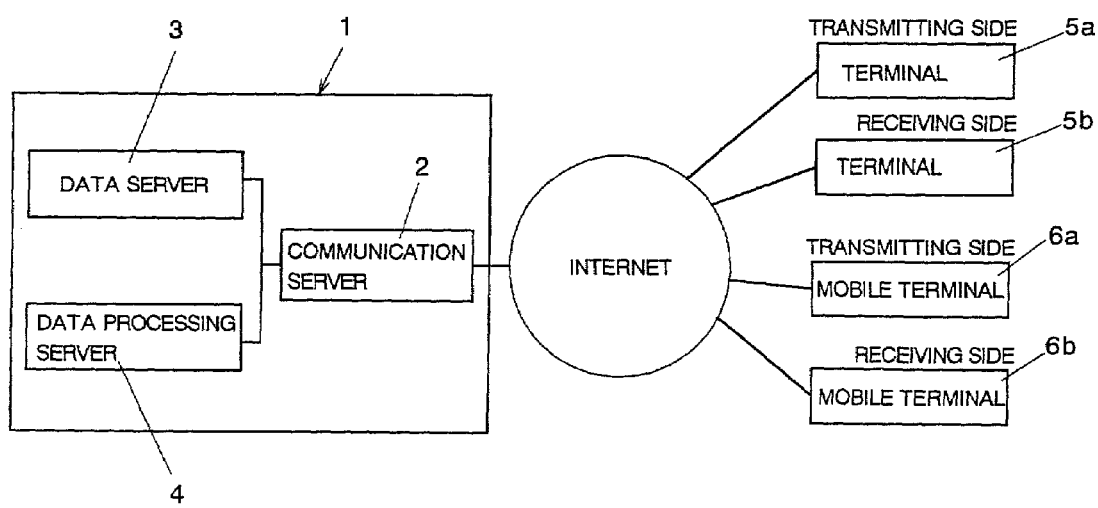
FIG. 1 is a diagram illustrating the configuration of a communications system according to the present invention.

FIG. 1 is a diagram illustrating a system configuration according to the present invention. Administrator server 1 has functions as a communication server 2 used for access to Internet, as a data server 3 for recording data, and as a data processing server 4 for processing data. The administrator server 1 may comprise a single computer fulfilling all the functions of the administrator server 1 or plural computers sharing the functions.

User terminals 5a and 5b and mobile terminals 6a and 6b (inclusive of mobile phones) are accessible to the administrator server 1 through Internet. The connection between such a terminal and the administrator server 1 may be established wirelessly. The general concept including the terminals and the mobile terminals is herein referred to as a user terminal 5 or 6.

User Registration

To utilize the communications system of the present invention, it is first required that communication software enabling transmission and receipt of a character message be installed in a user terminal 5 or 6. Such communication software may be obtained either in the form of a medium such as a CD-ROM or by downloading it through Internet or the like.

A person (or a party) who has newly installed the communication software in a user terminal has to follow the procedure of user registration. When the person accesses a predetermined URL of the system administrator through Internet, a "user registration screen" as shown in FIG. 22 is displayed.

Then, the person inputs necessary information such as his or her mail address and password to the "user registration screen". In this embodiment, the nickname of the person to be displayed upon transmission of a mail can also be registered.

When clicking is made on a register button after the entry of the necessary information, a "user registration confirmation screen" as shown in FIG. 23 is displayed. If there is missing information or an input error, an error message is displayed to request re-entry of the necessary information.

The "user registration confirmation screen" displays the information previously input to the "user registration screen" by the user to have the user confirm whether or not there is an error in the information registered. When the user clicks on the register button in the screen after the confirmation has been made, the administrator server 1 records the user information in "user information database" of the data server 3.

Subsequently, the administrator server 1 transmits a mail notifying the user of the completion of user registration as shown in FIG. 24 to the mail address registered. This registration completion notifying mail mentions the user ID of the user.

When the transmission of the user registration completion notifying mail is done, a "user registration completion screen" as shown in FIG. 25 is displayed.

Initial Start-up of the Software

When the user starts up the communication software for the first time, a "user information inputting screen" as shown in FIG. 26 is displayed. The user inputs the user ID and password registered (a notice of which is contained in the registration completion notifying mail already transmitted to the user) and then clicks on the OK button. By so doing, the user ID and the password are transmitted to the administrator server 1.

The administrator server 1 checks whether or not the user ID and password are correct by collating them with the user information recorded in the database. If they are judged to be correct, the manager server 1 transmits a confirmation message to the user terminal 5 or 6. When the user terminal 5 or 6 receives the confirmation message transmitted from the administrator server 1, the user terminal 5 or 6 becomes ready for use.

If either or both of the user ID and the password are not correct, an error message is transmitted to the user terminal 5 or 6 and the "user information inputting screen" is displayed again to urge the user to input the user information again.

Group Registration

The user becomes a member of a group to make good use of the system of the present invention. Settings related to formation on a new group, addition of a new member to a group, deletion of a member from a group, and the like are established by making access to a predetermined URL of the administrator server 1.

When the user accesses the predetermined URL, a "group registration-correction screen" as shown in FIG. 27 is displayed. When a new group is to be formed, a new registration form is filled out with the user ID and password of a representative of the group and the name and password of the group and then clicking is made on the register button to register the group.

When the group has been newly registered, a "new group registration confirmation screen" as shown in FIG. 28 is displayed. The user checks the registered information displayed. If there is no error, the user clicks on the register button to register the group definitely.

When the group registration has been definitely made, the administrator server 1 registers the information on the newly formed group in a "group information database". In the "group information database" are recorded the group ID, group name, group password, and the ID of the group representative.

Upon completion of the registration, the administrator server 1 transmits a group registration completion notifying mail as shown in FIG. 29 to the mail address of the group representative. In response to the transmission of the group registration completion notifying mail, a "new group registration completion screen" as shown in FIG. 30 is displayed. Thus, the group registration procedure is completed.

Member Registration

At the time only a new group is registered, members forming the group are not registered yet. Thus, the members of the group are to be registered next.

When clicking is made on a "user addition" button in the "new group registration completion screen" (FIG. 30), a "group information renewal page" as shown in FIG. 31 is displayed.

When a user is to be newly registered as a member of the group, an "addition of a user to the group" section is filled out with the user ID, mail address and account of the user and a user's nickname for use within the group.

In transmitting a character message to a member of the group, the member can be specified by "account@group". For example, if the group is named "ace" and the account is "king", a character message can be transmitted to the member identified by "king@ace". Since duplication of an account within the same group makes it impossible to specify a member, it is required that duplicated registration of an account within a group be avoided.

The mail address of a user is input for the purpose of authentication. If the user ID and mail address of a user to be registered as a member of the group are not the same as those already registered in the user information database, registration of the user as a member of the group is not permitted. This prevents a user from being registered as a member of an unknown group without the user's consent.

Accordingly, it is possible to prevent a user from being registered as a member of a group, for example, for advertisement of a corporation or an organization without the user's consent and hence from receiving unwanted direct mails or mischievous mails as well as to prevent the representative of a group from making an error in member registration.

The nickname of a user is used to specify the user in transmitting a character message within the group to which the user belongs. Though the nickname of a user has already been registered upon user registration, the user, if belonging to plural groups, may wish to use different nicknames in different groups.

For a user to change his or her nickname on a group basis, the system of the present invention allows registration of a nickname to be used in only one group. For example, a nickname "general affairs Yamada T" consisting of the name of a division or section and the name of the user may be used in a group related to a company for which the user works, or a funny nickname "Mr. blue lizard" may be used in a group of friends.

In the case where there is no need to change the user's nickname on a group basis, a "nickname for use within a group" section is left blank so that the nickname registered upon user registration is automatically registered.

When clicking is made on the "user addition" button in the screen after the entry of necessary information, an "additional group user confirmation screen" as shown in FIG. 32 is displayed.

However, if there is duplication of the account of a member to be registered or an error in the mail address, the administrator server 1 causes the "group information renewal page" to be displayed again following an error message in order to urge the one accessing the administrator server 1 (usually the representative of a group) to input the necessary information again. It is kind enough if the error message contains the cause of the error, reading for example: "The account is duplicated. Change the account for another account." Alternatively, it is possible to display a screen such as to allow re-entry of only the information item input by mistake without displaying the "group information renewal page" again.

The "additional group user confirmation screen" displays the information on the member to be added to the group, and if there is no error in the information, clicking is made on the "user addition" button to register the member.

When the administrator server 1 receives a registration, it records the registration information in a "group management database" provided on a group basis. The "group management database" stores data of "user ID of a group member", "user account" and "nickname for use within a group".

Thereafter, the administrator server 1 transmits a "group user registration completion notifying mail" as shown in FIG. 33 to the user added as a member of the group and to the representative of the group and then causes an "additional user registration completion screen" as shown in FIG. 34 to be displayed.

Since the "group user registration completion notifying mail" is transmitted to the user added as well as to the representative of the group, the user is notified of the completion of registration even if the group representative has followed the procedure for registration of addition of a member to the group.

The user thus added to the group inputs the group ID mentioned in the "group user registration completion notifying mail" to a setting screen of the communication software installed in the user's own terminal 5 or 6. This embodiment is configured such that once the group ID has been set in the communication software of the user, the user ID and group ID are automatically transmitted to the administrator server 1. The administrator server 1 searches the group information database to check whether or not the user ID thus transmitted is included in the group having the group ID thus transmitted. If not, the administrator server 1 transmits an error message to the user added to the group. Thus, the user added is prevented from making an error in setting the group ID.

In this way, the procedure for registering a new member of the group is completed. The procedure for adding a member to an existing group or deleting a member from the existing group is described later.

Start-up and Termination of the Communication Software

Figure 7:
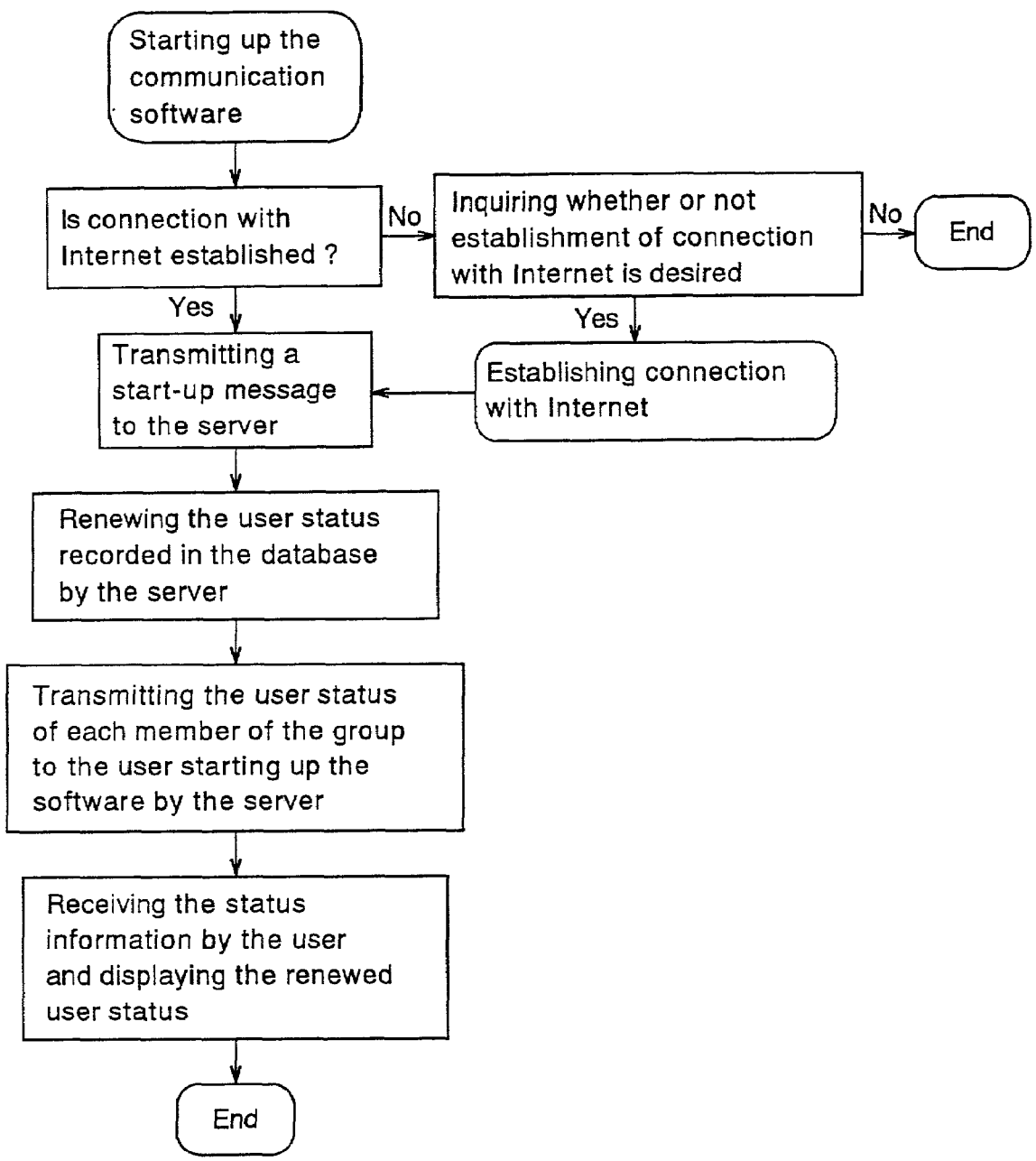
FIG. 7 is a flowchart of the procedure for starting up communication software.

FIG. 7 is a flowchart of the procedure for starting up the communication software. When the communication software according to this embodiment is started up, the communication software judges whether or not the terminal is on-line with Internet. If the connection with Internet is being established, a start-up message is transmitted from the user terminal 5 or 6 to the administrator server 1.

If the connection with Internet is not established, an inquiry as to whether the user wishes to establish connection with Internet is displayed on the screen of the user terminal 5 or 6. When the user gives an instruction to establish connection with Internet, the connection with the Internet is established and then the start-up message is transmitted from the user terminal 5 or 6 to the administrator server 1.

If the connection with Internet is not established, the communication software cannot provide communication because the communication software is kept off-line with Internet. Even in this state, the user is capable of checking the record of previously received transmissions as will be described later.

Upon receipt of the start-up message from the user terminal 5 or 6, the administrator server 1 accesses the "user information database" and change the user status to "OnNet".

The "user status", used herein, is information on the current status of a user and is roughly divided into the following two attributes: "OnNet" and "OffNet".

The attribute "OnNet" indicates a state where the user terminal 5 or 6 is on-line with Internet through a communication channel while the communication software in the user terminal 5 or 6 is active.

The attribute "OffNet", on the other hand, indicates a state other than the state indicated by "OnNet", namely a state where the user terminal 5 or 6 is off-line with Internet or a state where the communication software is not active in the user terminal 5 or 6 even if the user terminal 5 or 6 is on-line with Internet.

After the administrator server 1 has changed the user status of the user starting up the software to "OnNet", the administrator server 1 searches the group management database associated with the group to which the user belongs to extract the members of the group. Subsequently, the administrator server 1 extracts the current user status of each user as a member of the group from the "user information database" and transmits it as user status information to the user starting up the software.

Figure 9:
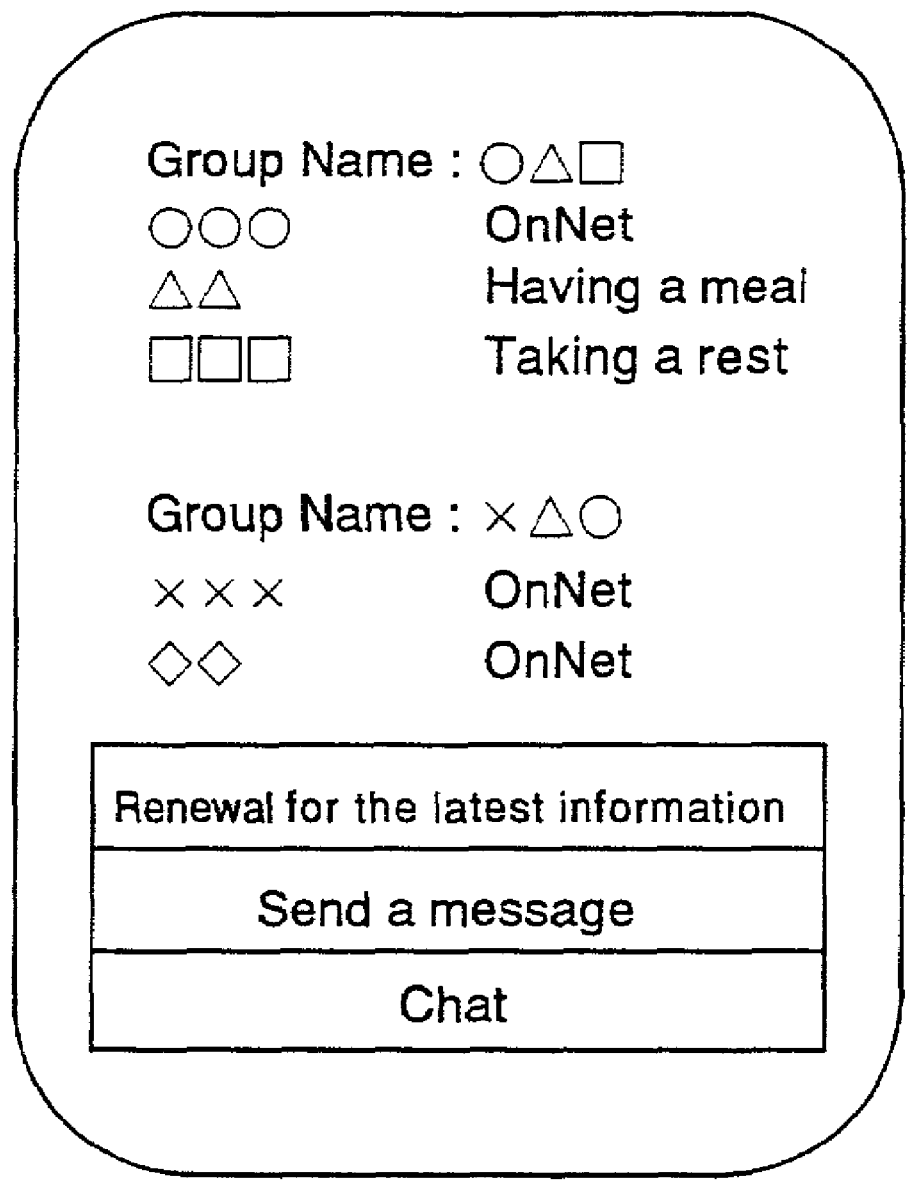
FIG. 9 is an illustration of a "basic screen"

When the communication software starts up, a "basic screen" as shown in FIG. 9 is displayed on the user terminal 5 or 6. The "basic screen" displays the user status of each user belonging to the same group according to the user status information transmitted from the administrator server 1.

In the case where the user belongs to plural groups, names of all of the groups and the user status of all the members belonging to the groups are displayed.

Though user status is roughly divided into the two attributes: "OnNet" and "OffNet" as described above, the attribute "OnNet" may be further divided into detailed attributes, for example, "working", "having a meal", "meeting a visitor", "taking a rest" and "leaving my seat for a while", all of which retain the attribute "OnNet".

Though it is possible to select desired ones of such detailed user status items provided by the communication software, a user may create original user status items by directly inputting them as will be described in detail later.

Figure 5:
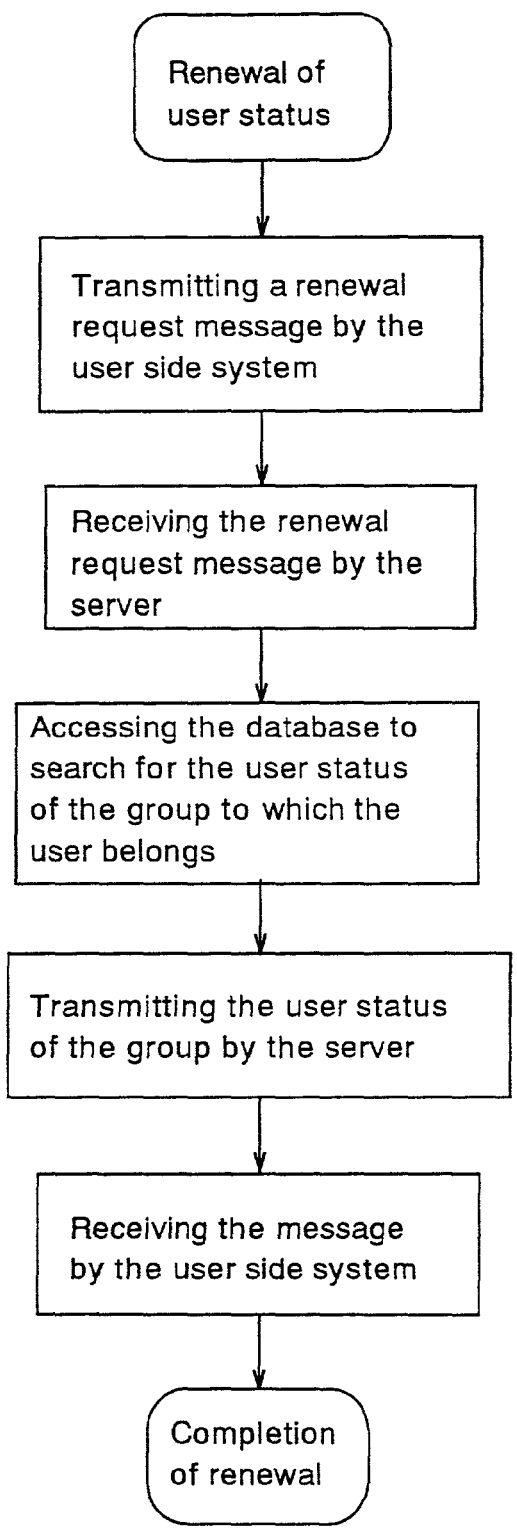
FIG. 5 is a flowchart of the procedure for renewing user status.

FIG. 5 is a flowchart of the procedure for renewing the user status. The terminal 5 or 6 of each user transmits a user status renewal request for latest information to the administrator server 1 at a predetermined time interval. Upon receipt of the user status renewal request for latest information, the administrator server 1 accesses the "user information database" and searches for the group to which the user belongs. Subsequently, the administrator server 1 accesses the "group management database" associated with the group searched to extract the members of the group and then accesses the "user information database" associated with each user as a member of the group to extract the latest user status of the members. Then, the administrator server 1 transmits the latest user status information of the members (all the members excluding the user transmitting the renewal request for latest information) of the group to the user terminal 5 or 6 of the user making the request.

The "basic screen" of the user terminal 5 or 6 displays the user status received last (at the latest) until the latest user status information is received in response to the next user status renewal request for latest information. Though a shorter time interval at which the request is made is more preferable in obtaining the latest user status, the time interval may be appropriately set in view of the capacity of the user terminal 5 or 6 because frequent renewal becomes a heavy load imposed on the user terminal 5 or 6.

The "basic screen" is provided with a "renewal for latest information" button. When clicking is made on this button, a request for latest information is immediately transmitted to the administrator server 1 separately from the aforementioned periodical request for latest information. Thus, it is possible to have the administrator server 1 transmit the latest user status information so that the user terminal 5 or 6 of a user displays the latest user status whenever the user desires it.

Though it is convenient for a user to know the status of other members if the desktop of the user terminal 5 or 6 constantly displays the "basic screen", an arrangement is possible such that when the user wishes to fully utilize the desktop, the "basic screen" is scaled down except when the user wishes to look at the basic screen largely displayed.

Figure 10:
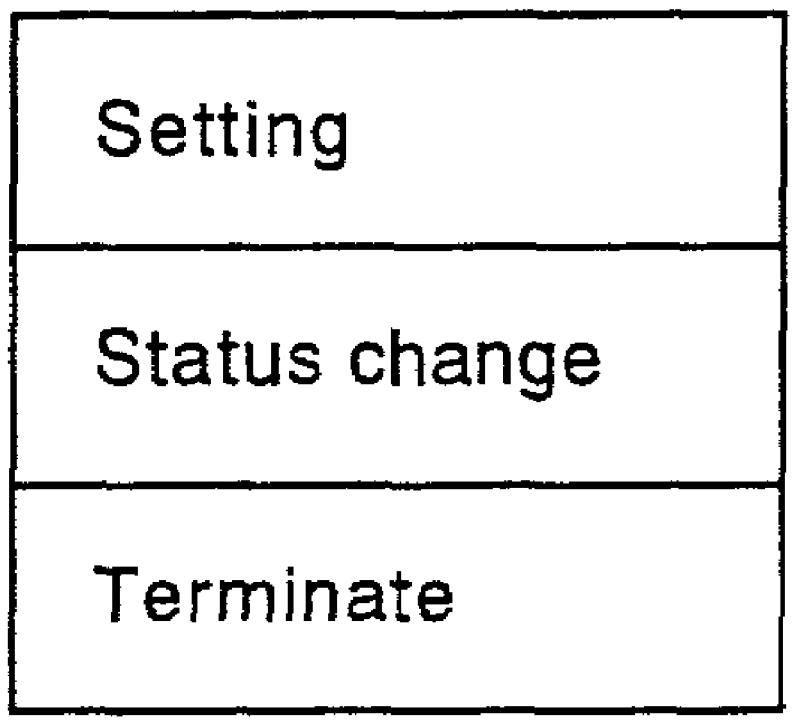
FIG. 10 is an illustration of a "menu bar"
Figure 11:
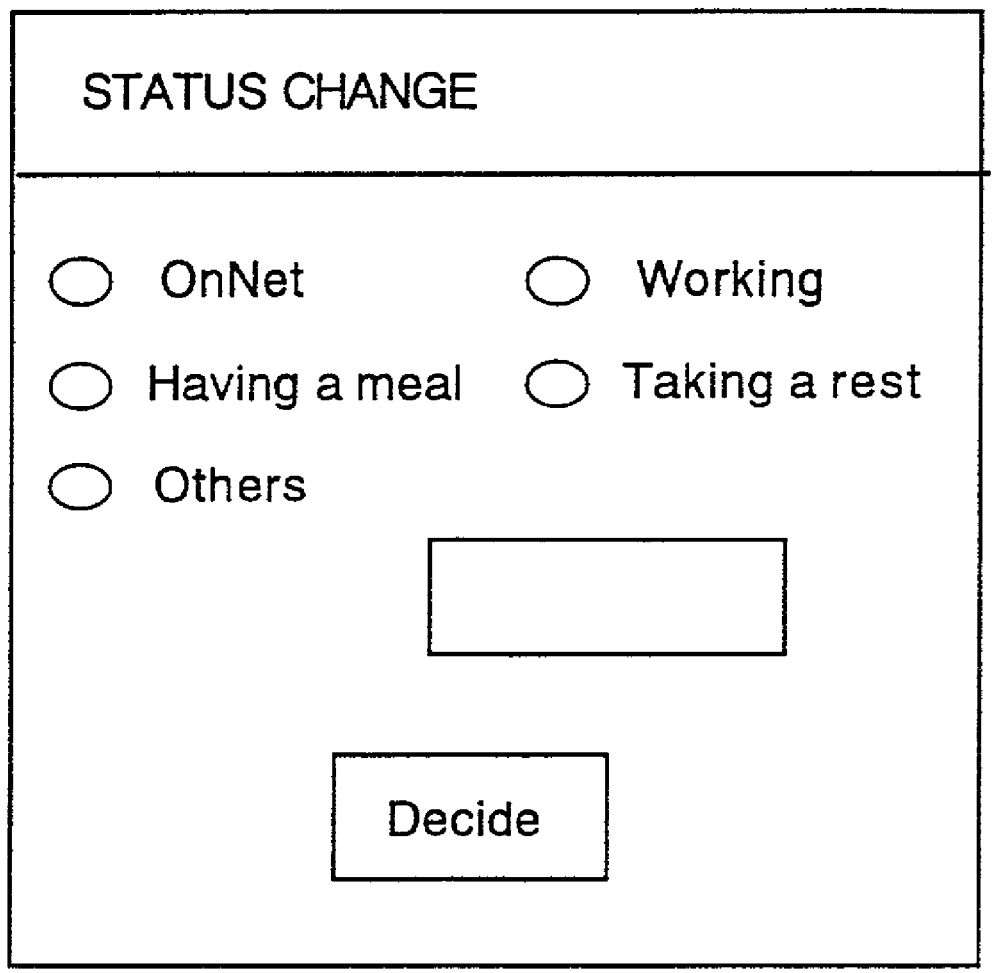
FIG. 11 is an illustration of a "status changing screen"

When right-clicking is made on the "basic screen", a menu bar as shown in FIG. 10 is displayed. When the item "setting" of the menu bar is selected, various settings including information renewal interval setting, display font setting and window skin (screen pattern) setting can be established. "Chat" can be selected on the "basic screen". The "chat" is described later.

Figure 8:
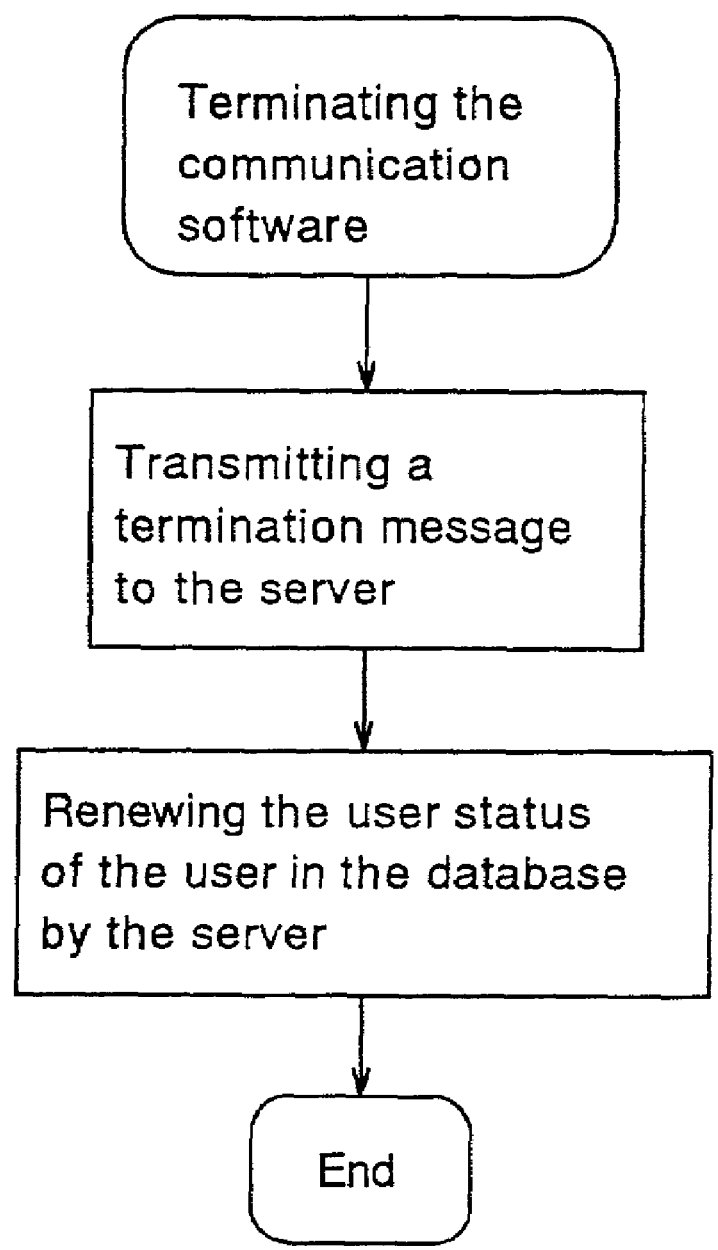
FIG. 8 is a flowchart of the procedure for terminating communication software.

FIG. 8 is a flowchart of the procedure for terminating the communication software. When an instruction to terminate the communication software is given, the user terminal 5 or 6 transmits a termination message to the administrator server 1, and then the communication software is terminated.

Upon receipt of the termination message, the administrator server 1 accesses the "user information database" associated with the user ID contained in the termination message and then changes the user status of the user to "OffNet".

Transmission Procedure

Figure 2:
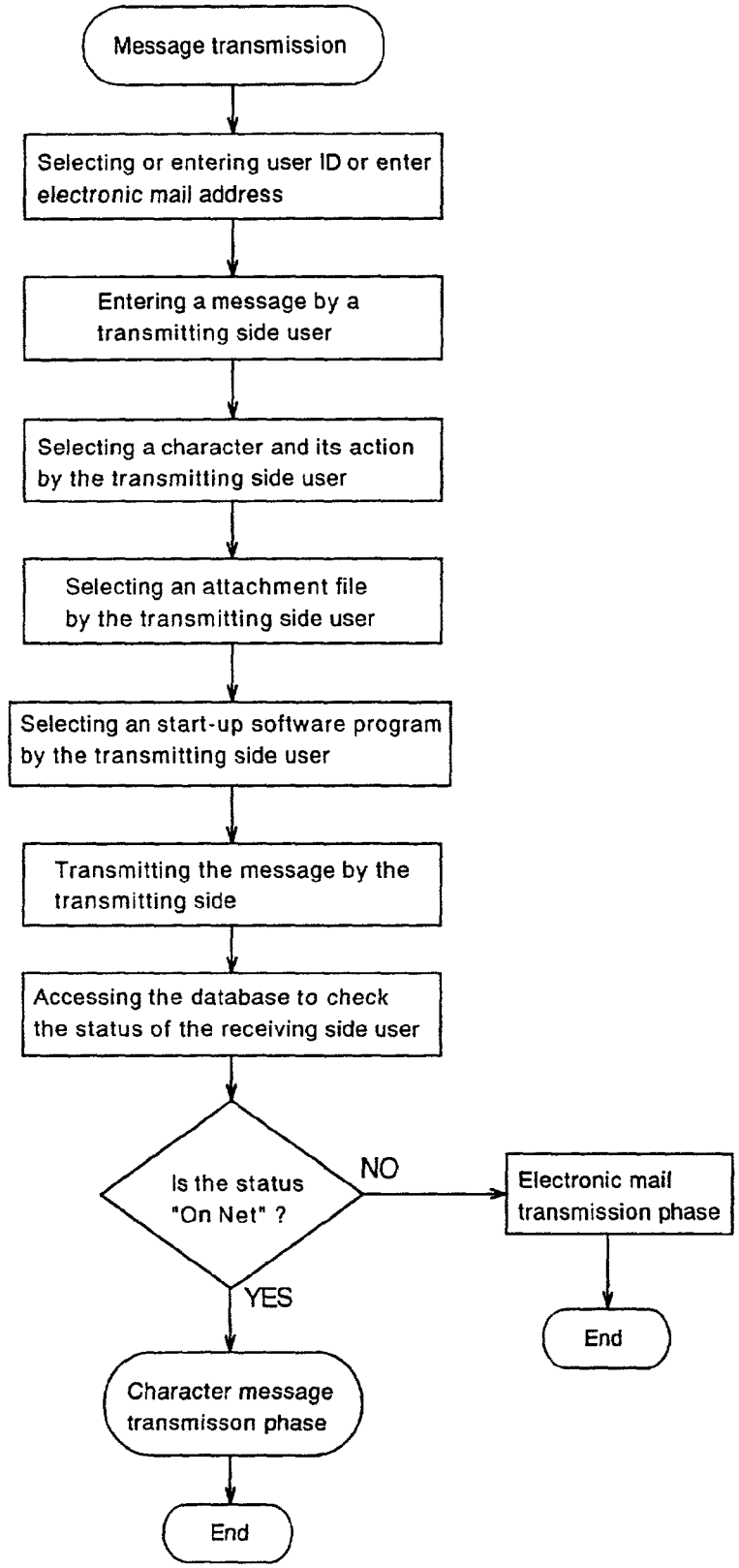
FIG. 2 is a flowchart of a message transmitting procedure.

FIG. 2 is a flowchart of the procedure for transmitting a message. When clicking is made on a "send a message" button on the "basic screen" after the start-up of the communication software, a "message addressee member selecting screen" as shown in FIG. 12 is displayed. A member to which a message is to be transmitted is selected by selecting the user ID of the member, or entering the user ID in a member section, or entering the electronic mail address of the member in a mail address section. The member can be selected from the list of communication-enabled members within the group.

In selecting a message addressee it is better to take the user status of the addressee into consideration. If, for example, the user status of the addressee is "absent", "meeting a visitor" or the like, it is highly possible that the message transmitted is not read immediately. Efficient transmission of a message at addressee's convenience is also possible.

A member out of the group can be selected by inputting the member's account within another group and the name of the group. Such a member may also be selected by inputting the member's mail address. By selecting plural addressees it is possible to transmit the same message to them at a time.

When clicking is made on a "message preparation" button on the "message addressee member selecting screen", a "message preparation screen" as shown in FIG. 13 is displayed. The "message addressee member selecting screen" includes a title section, a message section allowing a message to be written in a balloon, an attachment section for drag and drop of a file to be attached, and a selection screen for selecting a character and its action. A "title" and a "text message" both in letters are input to the title section and the message section, respectively, and a desired character and its action are selected. As required, a file to be attached to the message is dragged and dropped to the attachment section. Further, as the need arises, entry of the URL of a homepage that the transmitting side user wants to have the receiving side user view is made into a URL entry section, or entry of the name of a software program that the transmitting side user wants to have the receiving side user use is made into a software name entry section. By doing so, the URL or the start-up software program for starting up the aforementioned software program is embedded in the character selected. It should be noted that if the name of a software program that the transmitting side user wants to have the receiving side user use or the URL of a homepage is entered in the "text message" section, the name of the software program or the URL appears in the balloon. When clicking is made on the name of the software program or the URL in the balloon, access is made to the homepage linked with the URL, or the given software program is started up by the start-up software.

Figure 14:
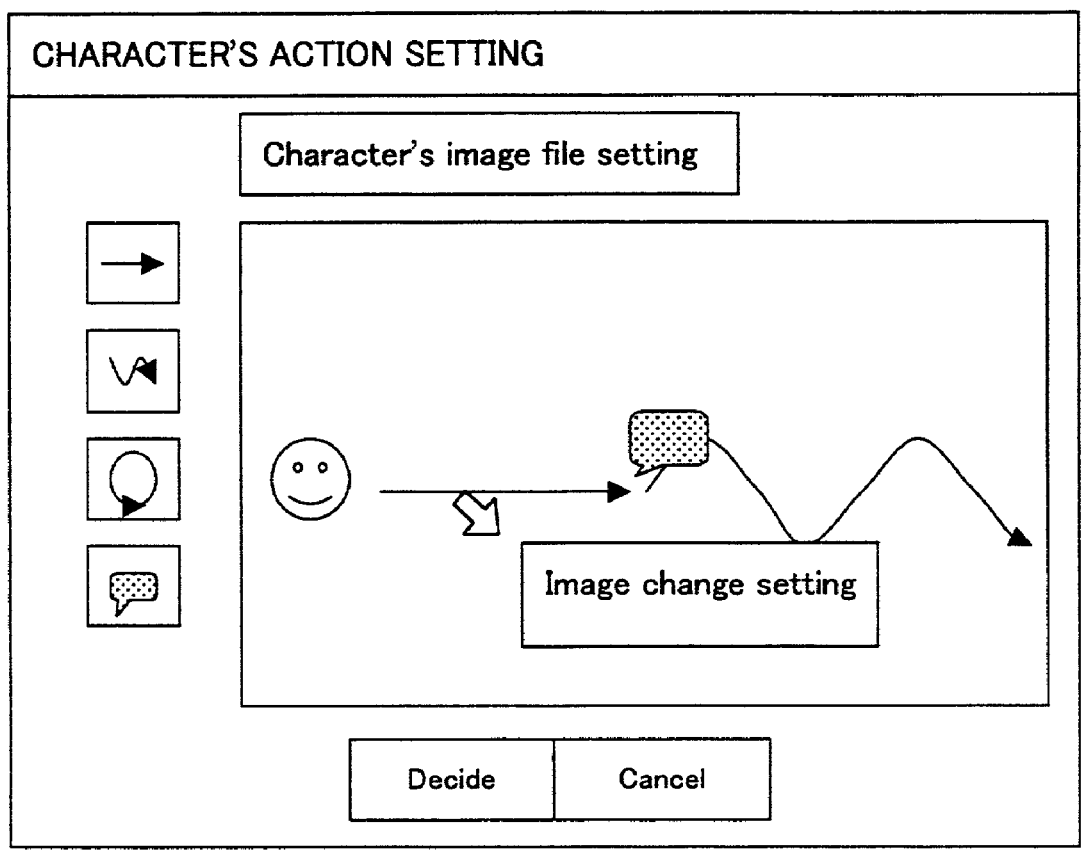
FIG. 14 is an illustration of a "character's action setting screen"

This embodiment is configured to allow a user to select a desired character and its action from typical characters and actions offered from the "message preparation screen". However, clicking on a "others" button causes a "character's action setting screen" as shown in FIG. 14 to be displayed for allowing the user to designate a character other than the typical characters or a more delicate action.

The image file of a desired character is loaded on the "character's action setting screen". To make the character funnier, it is possible to provide the character with optional arrangements such as a character's color, clothes, belongings, arms and vehicle. If a combination of multiple options is possible, the user is capable of creating his or her own original character. For example, the user can create such a funny character as a "blue turtle wearing a yellow helmet and having a shovel" or a "dolphin with white wings wearing sunglasses and having a gun".

It is convenient for the user if the character thus created can be registered in the form of a character file to be invoked whenever the user wishes to use it. If it is possible to register plural characters, the user can use different characters for different addressees, respectively.

As to character's actions, clicking on a button or the like provided on the "character's action setting screen" enables a desired action to be selected from the list of plural actions. It is possible to select a single action or designate plural actions so that they are performed sequentially. It is also possible to set a time period for which each action is performed.

An action designating button as illustrated in FIG. 14 allows a user to designate simple actions such as "move", "jump" and "turn around". A button allowing the user to select more complicated actions sequentially may be provided. For example, it is possible to designate a series of actions, for example, the character "hands a bunch of flowers to the addressee", "makes a bow" and then "runs about".

It is also possible to register the test message display timing in association with a certain action. For example, it is possible to designate a series of actions such that the character "hands a bunch of flowers to the addressee", displays a message "Happy birthday" or the like in the balloon of the character, "makes a bow" and then "runs about".

When clicking is made on a "decide" button, the "message preparation screen" shown in FIG. 13 is resumed. After the entry of the title and message and selection of the character and its action have been made, clicking on a "send" button on the screen enables transmission of a character message comprising character information on the character designated, action information on the character's action designated and the message to the administrator server 1.

Such character information or action information is not information containing data of an image or a motion picture but information for specifying a file containing data of the character's action on the receiving side and, hence, the capacity of such information is small. Thus, such information can be transmitted in a relatively short time and does not become a burden on communication.

Upon receipt of the character message information, the administrator server 1 accesses the "user information database" associated with the message addressee and checks the current user status of the message addressee.

Figure 3:
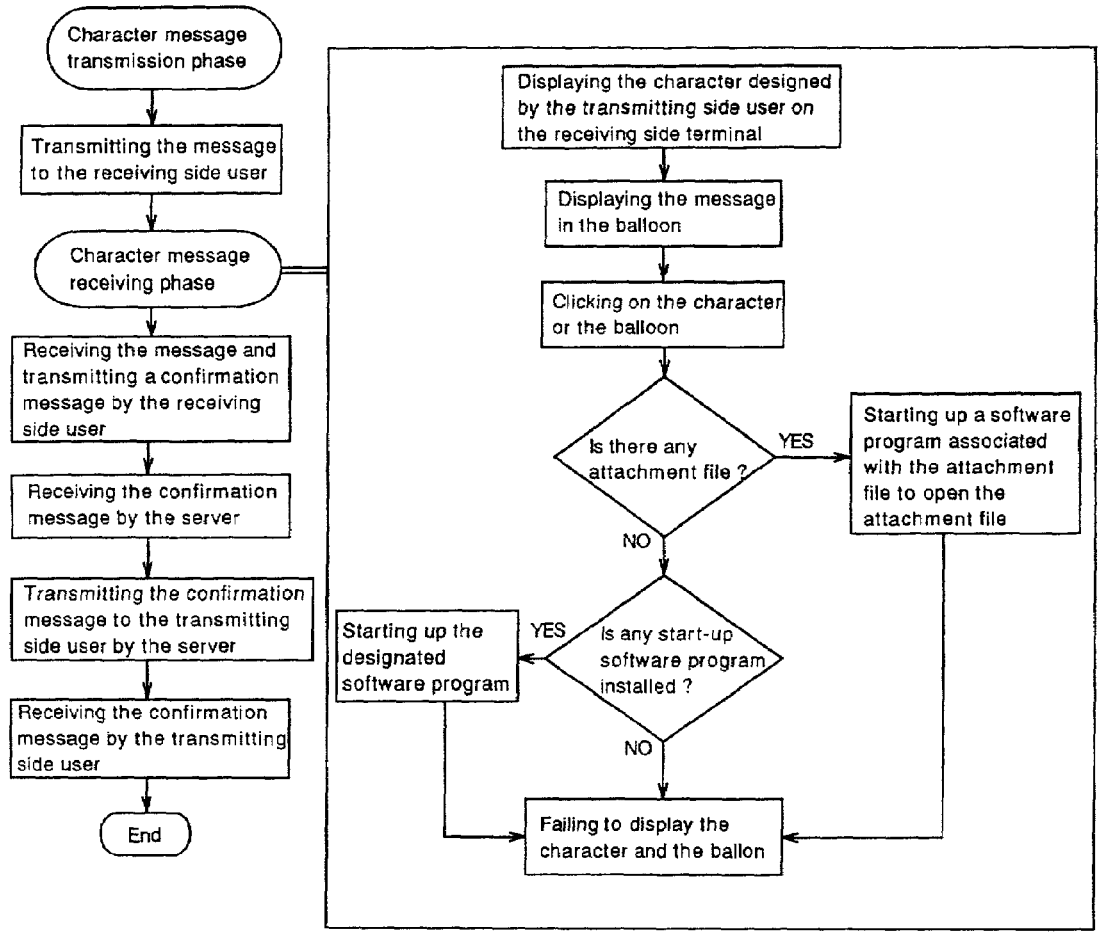
FIG. 3 is a flowchart of a character message transmission phase.

When the user status of the receiving side user is not the "OffNet", the system enters a character message transmission phase. FIG. 3 is a flowchart illustrating the procedure of the character message transmission phase. In the character message transmission phase the administrator server 1 transfers the received character message to the receiving side user. When the receiving side receives the character message, the character designated by the transmitting side is displayed on the receiving side terminal 5b or 6b with the text message displayed in the balloon in a "character message receiving phase" illustrated in detail in FIG. 3 on the right-hand side. If a start-up software program for starting up any desired one of various software programs (such as spreadsheet software, word processing software, game software and browser software) is embedded in the character or the balloon (or the word portion in the balloon), clicking on such a portion causes the desired software program to start up.

Since a character message is not a usual electronic mail, this embodiment uses a protocol adapted exclusively for communication of character messages without using a protocol such as POP or SMTP adapted for electronic mails.

FIG. 15(a) illustrates an example of a character's action displayed on the screen of a personal computer serving as a receiving side terminal upon receipt of a character message, while FIG. 15(b) illustrates such a character's action displayed on the screen of a mobile phone 6 serving as a receiving side terminal. When the receiving side terminal receives a character message, the designated character performs the designated action on the screen of the receiving side terminal. More specifically, a motion picture file (animation GIF or the like) corresponding to the character information and action information received is selected from information stored in the receiving side terminal, and then this motion picture file is executed in the designated sequence to cause the character to perform actions in the designated sequence.

The character stops acting at the time the text message is displayed in a text message display window. Accordingly, the display of the text message does not terminate unless the receiving user becomes aware of the message.

When the receiving side user having read the text message dismisses the text message display window, the receiving side terminal 5b or 6b automatically transmits a receipt confirmation message to the administrator server 1 and the character performs the remaining actions. When the character goes out of the screen, the character message terminates. The transmission of the receipt confirmation message may be effected after the character has completed the remaining actions. In the case where the character message is attached with an attachment or the transmitting side designates various software programs, clicking on the character portion or the balloon causes a software program (for example, a word processing program or a spreadsheet program) associated with the attachment (if exists) to start up thereby opening the attachment. Alternatively, in the case where there is no attachment but a start-up software program for starting up a game program is designated, clicking on the character portion or the balloon causes the game program to start up so that the receiving side user can play the game. If such a software program is a browser software program, clicking on the character portion or the balloon causes access to be made to the transmitting side or to a homepage that the transmitting side wants to show the receiving side, so that the homepage is displayed on the screen of the receiving side terminal 5 or 6.

Unlike a conventional electronic mail consisting of text only, the communications system of the present invention is capable of transmitting various characters having various expressions and performing various actions which can convey feelings of the transmitting side user to the receiving side user and which, per se, can please the receiving side user.

After receipt of the receipt confirmation message, the administrator server 1 transfers to the transmitting side terminal 5a or 6a a receipt confirmation based on the receipt confirmation message received. Thus, the transmitting side user is capable of making sure that the receiving side user has read the message transmitted by the transmitting side user as well as of easily transmitting various messages to the receiving side user by means of various software programs.

In the case where the receiving side does not immediately transmit the receipt confirmation message (or does not dismiss the text message display window) and the administrator server 1 transmits the receipt confirmation message to the transmitting side terminal 5a or 6a after lapse of a certain time period, it is possible that the user status of the transmitting side terminal 5a or 6a assumes "OffNet". In this case the administrator server 1 keeps the receipt confirmation message until the user status of the transmitting side terminal 5a or 6a becomes "OnNet". When the user status of the transmitting side terminal 5a or 6a becomes "OnNet", the administrator server 1 transmits the receipt confirmation message to the transmitting side terminal 5a or 6a.

In the case where when a character message is transmitted, a file related to a character designated by the transmitting side is not installed in the receiving side terminal 5b or 6b, the administrator 1 transmits to the receiving side terminal 5b or 6b the file related to the action of the character in response to a request from the receiving side terminal 5b or 6b.

In this way the communication software of the receiving side terminal 5b or 6b thus installed with data of the character becomes capable of executing the file. Therefore, the transmitting side can designate any desired character without worrying about whether or not the file related to the designated character is installed in the receiving side terminal 5b or 6b.

If a next character message using the same character is transmitted to the receiving side terminal 5b or 6b, there is no need to have the administrator server 1 transmit action data of the same character because the file of the action data is already recorded in the receiving side terminal 5b or 6b.

Figure 4:
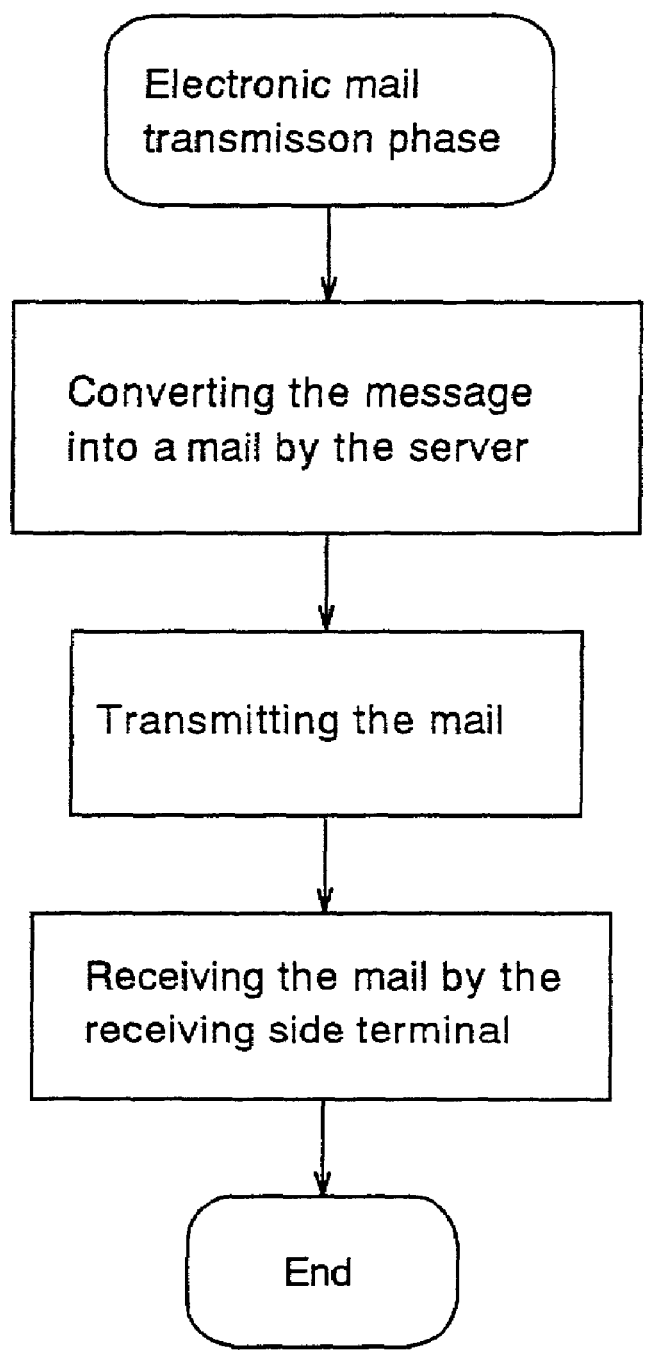
FIG. 4 is a flowchart of an electronic mail transmission phase.

When the user status of the receiving side terminal 5b or 6b is "OffNet", the administrator server 1 enters an electronic mail transmission phase. FIG. 4 is a flowchart illustrating the procedure in the electronic mail transmission phase.

The administrator server 1 copies a received text message to an electronic mail. Character information and character's action information are transmitted as attachments together with the text message. In this case the character message is in the form of an ordinary electronic mail, communication is made using a protocol, such as POP or SMTP, adapted for communication of electronic mails.

When the receiving side terminal 5b or 6b receives the electronic mail thus prepared by means of the communication software, the original character message is restored upon opening of the electronic mail and the character begins performing its action. Thereafter, as described above, the text message is displayed in the text message display window, and when the text message display window is dismissed, the receiving side terminal 5b or 6b automatically transmits a receipt confirmation message to the administrator server 1, while the character performs the remaining actions. Before dismissing the text message display window, clicking may be made on the character or the balloon transmitted from the transmitting side to open the attached file or activate the start-up software program. Clicking on one of the character or the balloon causes the message display window to be dismissed while, at the same time, causing the character to perform the remaining action. In response to the dismissal of the message display window, the receiving side terminal 5b or 6b automatically transmits the receipt confirmation message to the administrator server 1 in the manner described above.

Where there are plural message addressees, some of them assuming the user status "OnNet", the others assuming the user status "OffNet", a character message is transmitted to those assuming the user status "OnNet", while an electronic mail is transmitted to those assuming the user status "OffNet". The procedure in each case is the same as described above.

Recording of Received Mail

Each user terminal 5 or 6 is capable of storing a received character message or an electronic mail. FIG. 18 illustrates a "received message box" in which recording of character messages and electronic mails are allowed as sorted on a group basis and on a user basis. If a user is selected, the title of the character message or electronic mail transmitted from the user and the date and time of receipt are displayed.

If the user opens the file while designating a character message or an electronic mail, the receiving side user can view the character message or the electronic mail again and again. In the case of a message incorporating a character's action or the like, the character's action is reproduced in the same manner as when the message was received. In this case, a receipt confirmation message is not transmitted to the administrator server 1.

Renewal of Status

When right-clicking is made on the basic screen shown in FIG. 9, a menu as shown in FIG. 10 is displayed. Clicking on a "status change" button on the menu causes a "status change screen" as shown in FIG. 12 to be displayed. When a user selects a desired one of status items provided on the "status change screen" by means of a radio button and then clicks on a "decide" button, the user status of the user is changed and user status information is transmitted to the administrator server 1.

If the user feels it troublesome to invoke the menu and then the "status change screen" and select a desired status item, it is possible to assign different status items to individual function keys and register the assignment, whereby merely depressing a function key makes it possible to transmit the user status item assigned to that function key.

If the user wishes to use original user status items other than those provided on the screen, an "others" button is selected and appropriate words (for example, "bathing", "meeting a visitor", "shopping for a while" or the like) are freely entered in a text box located adjacent the "others" button. When clicking is made on a "decide" button, the words entered are transmitted as user status information to the administrator server 1.

In the event that the user terminal 5 or 6 becomes incapable of automatically transmitting a user status renewal request for latest information to the administrator server 1 due to anomalies in the communication channel or the user terminal 5 or 6, the administrator server 1 judges that the user status of a user terminal from which the user status renewal request is not transmitted for more than a predetermined time period is "OffNet" and then changes the user status of the user to "OffNet".

Renewal of Group Information

There may be a case where after a group has been registered, a member is added to or deleted from the group. In this case the representative of the group or the like accesses a predetermined URL of the administrator server 1 to cause the "group registration•correction screen" to be displayed.

When clicking is made on the "log in" button after entry of the correct group name and group password in a "log in" section, the "group information renewal screen" shown in FIG. 31 is displayed.

If the administrator server 1 judges that the group name or the group password is not correct by referencing the "group information database", the administrator server 1 causes an error message to be displayed to urge the group representative to enter the correct group name and group password without causing the "group information renewal screen" to be displayed.

Since the "group information renewal screen" displays the user IDs, names, mail addresses, accounts, and nicknames for use within the group of all the members of the group currently registered, an item to be corrected is rewritten and then clicking is made on the "correct" button. Upon receipt of corrected information, the administrator server 1 renews the information recorded in the group management database based on the corrected information.

When a member is to be deleted from the group, the member is selected and clicking is made on the "delete" button. Upon receipt of delete information, the administrator server 1 deletes information on the user to be deleted from the group management database based on the delete information.

When a user is to be added to the group, it is sufficient to follow the same registration procedure as the aforementioned group member registration.

Chat

Chat is a form of communication allowing plural parties to exchange messages in an on-line state as if they talked with each other in real time by causing their terminals to display the contents of communication on respective screens. The communication software used in the present invention has such a chat function.

Figure 16:
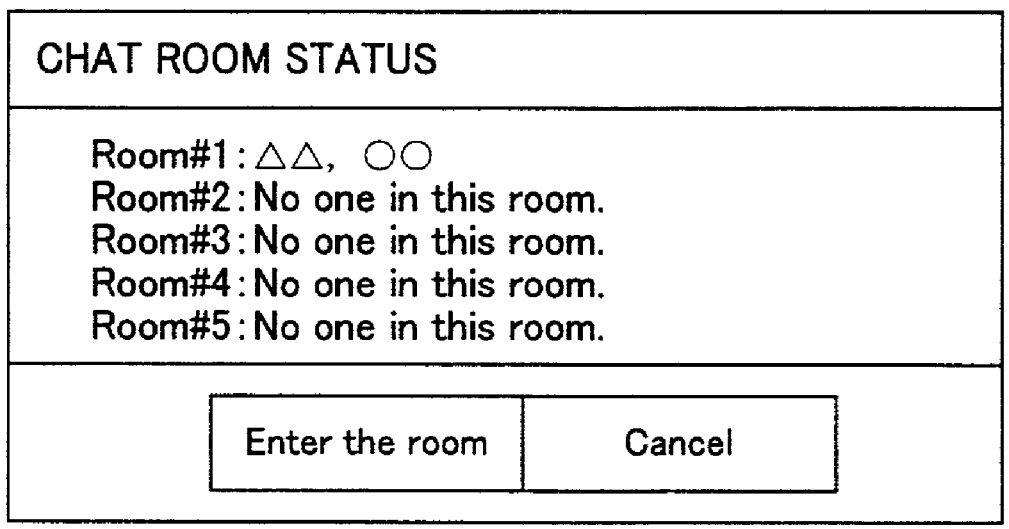
FIG. 16 is an illustration of a "chat room status screen"
Figure 17:
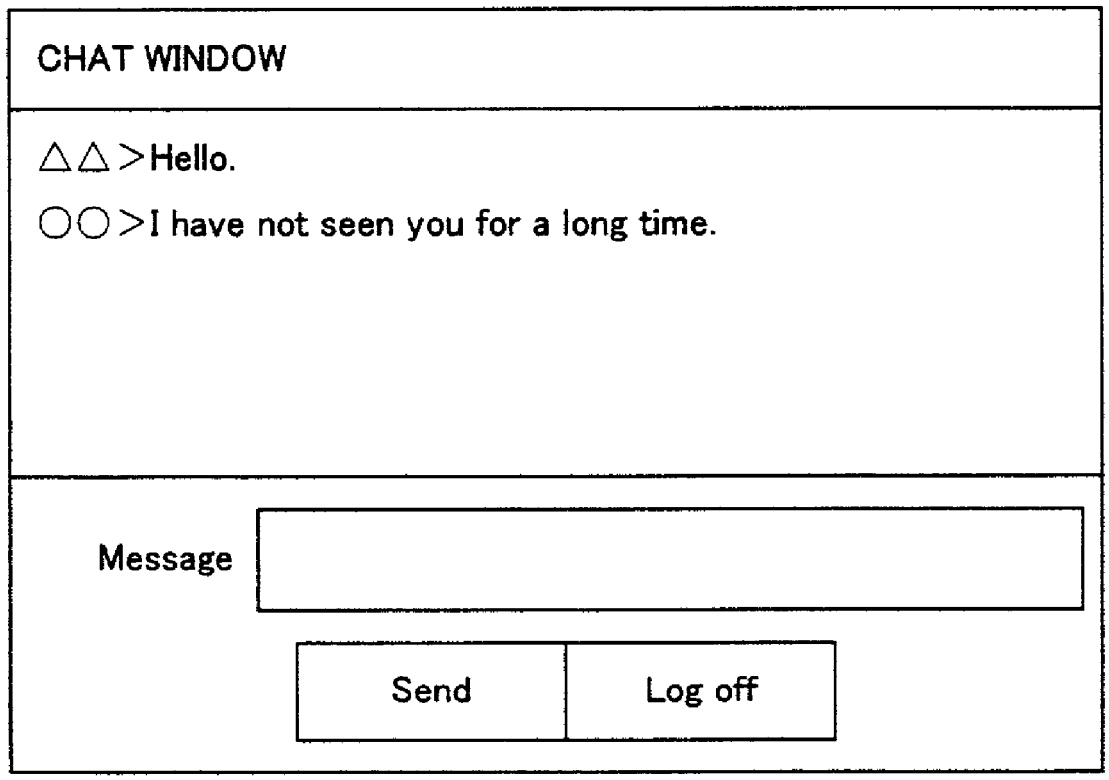
FIG. 17 is an illustration of a "chat window screen"

When clicking is made on a "chat" button provided on the basic screen shown in FIG. 9, a "chat room status screen" as shown in FIG. 16 is displayed. This "chat room status screen" displays plural chat rooms provided by the administrator server 1 and the status of each chat room. As the status of a chat room, users utilizing the chat room are shown. If no one utilizes the chat room, an indication "no one is in the chat room" is displayed.

A user may previously invite his or her friend or a like person to a chat room, like "Let us have a talk on recent movies in chat room #3 at eleven o'clock tonight." Otherwise, the user may enter a chat room where an acquaintance of the user is found to attend from the "chat room status screen". It is possible to previously provide chat rooms having respective subjects, for example, a "chat room about personal computers", a "chat room providing meeting", "chat room about sports" and the like.

When a user wish to attend a certain chat room, the user selects the chat room and clicks on an "enter room" button to cause a "chat window screen" to be displayed. The "chat window screen" comprises a chat window in which the contents of a chat transmitted from users utilizing the chat room are displayed, and a message box for a message to be written therein. When clicking is made on a "send" button, the message written in the message box is transmitted and displayed in the chat window. When clicking is made on "log-off" button, the user terminates the chat and leaves the chat room.

Communication using a Mobile Terminal

Figure 6:
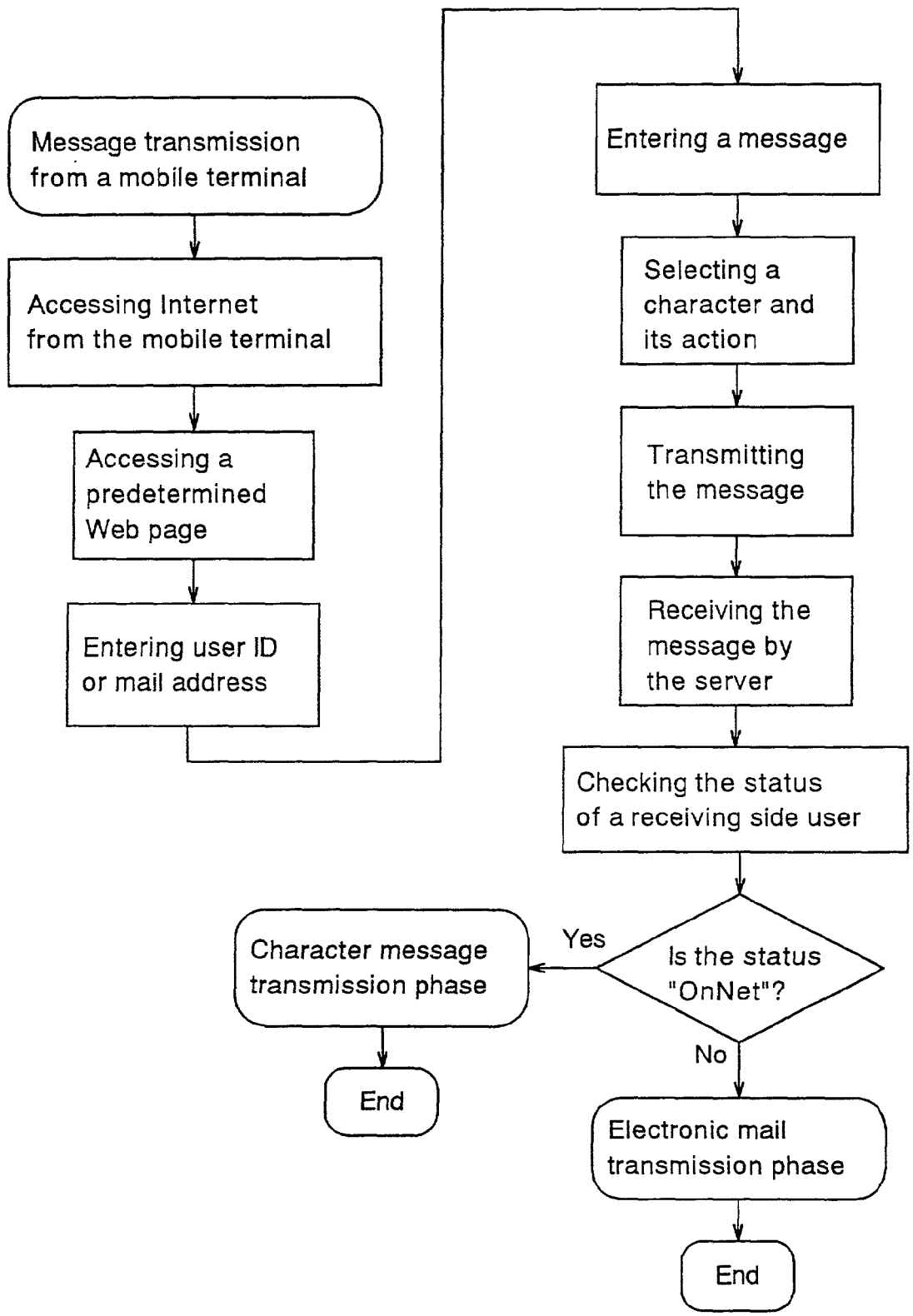
FIG. 6 is a flowchart of the procedure of a transmission from a mobile terminal.

FIG. 6 is a flowchart of the procedure for transmission from a mobile terminal such as a mobile phone. A user accesses a predetermined URL of the administrator server 1 using a mobile terminal through Internet.

Figure 19:
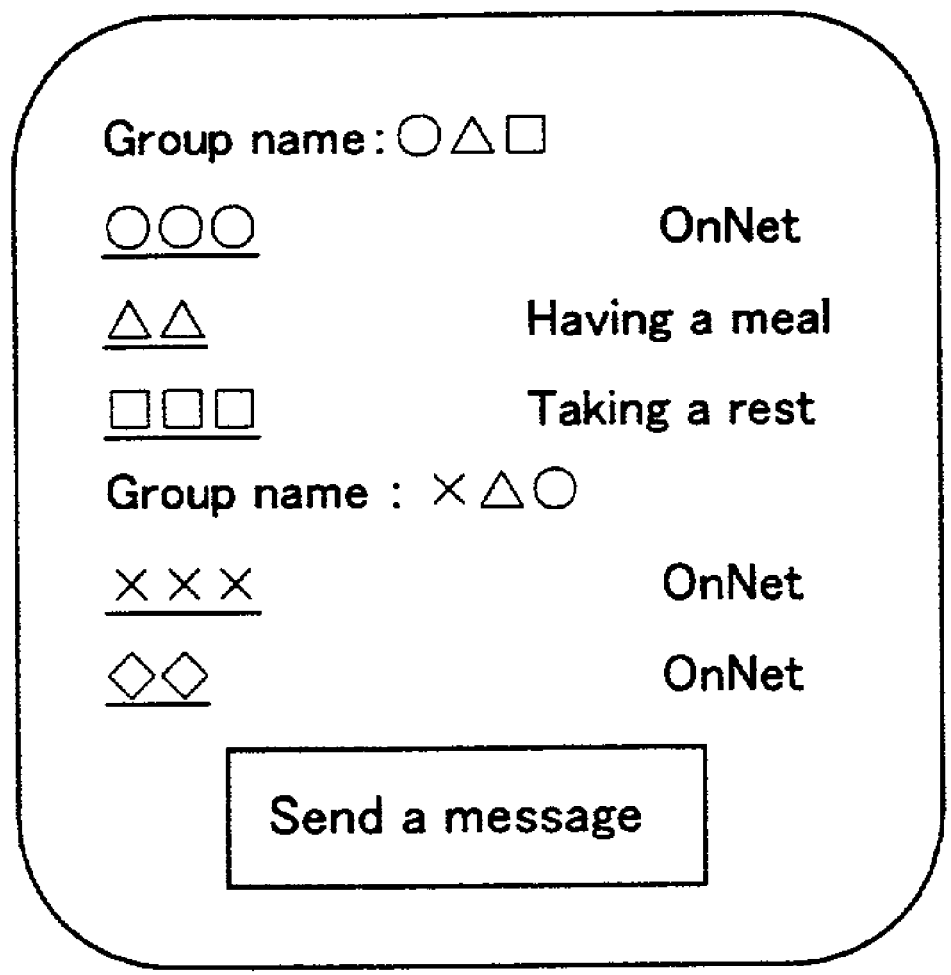
FIG. 19 is an illustration of a display screen appearing when access is made from a mobile phone.

FIG. 19 illustrates a display screen displayed when access is made from a mobile phone. The display screen displays the names of users and the user status of each user on a group basis. A user's name displayed is linked with the user as a message addressee and, hence, the message addressee is selected by merely selecting the user's name. Then, a "message preparation screen" as shown in FIG. 21 is displayed.

Alternatively, when "message" on the display screen is selected, a "message addressee user selecting screen" as shown in FIG. 20 is displayed. From this screen the user can designate a message addressee user by entering the user account of the message addressee user and the group name, or the mail address of the message addressee user. Thereafter, selecting the "message preparation" causes the "message preparation screen" shown in FIG. 21 to be displayed.

Subsequently, the title box and message box of the "message preparation screen" are filled out with the title of a message and the message, respectively. Unlike a common personal computer, a mobile terminal such as a mobile phone has a difficulty in setting a character and its action in detail. Therefore, this embodiment is configured such that a user can only select a character and its action from predetermined ones. After entry of the message and the like, selecting "send a message" causes the message to be transmitted to the administrator server 1.

Upon receipt of the message, the administrator server 1 searches the database for the user status of the receiving side user and enters the character message transmission phase when the user status is not "OffNet" or enters the electronic mail transmission phase when the user status is "OffNet" as in the foregoing usual message transmission procedure. Subsequently, the character message or the electronic mail is transmitted to the receiving side terminal in the same manner as described above.

One Example of Application of the Communications System

As described above, the communications system of the present invention has diverse functions including the function of enabling the user to convey his or her feelings expressively to a receiving side user using a character, the function of confirming that the receiving side user has read the message and like functions that the conventional electronic mailing system cannot realize. Therefore, the communications system of the present invention may find various applications.

For example, it is possible that each employee of a company has terminal 6 and the company checks the working state of each employee by the user status to always grasp the current activity of each employee. This makes communications within the company smooth and makes it possible to grasp the current status of each store or sales office, thereby making the company's business more efficient.

If a user is registered as a member of a group formed by a manufacturer or a distributor, the user becomes capable of obtaining the latest news from the manufacturer or the like with explanation by an image character. In this case a lottery-like element may be included. For example, the manufacturer randomly transmits a message with a prize to members of the group and then gives a present to the members receiving the message with the prize. By giving the present to each user having transmitted receipt confirmation of the message with the prize, it is possible to increase the number of members of the group. Since the manufacturer can advertise its goods for an increased number of users, efficient advertisement becomes possible.

The communications system of the present invention can be used in playing a game in a group of friends. For example, the game of "scissors-paper-rock" or a like simple game can be conceived. In this case, a transmitting side selects any one of "scissors", "paper" and "rock" and transmits a character message to a receiving side. On the receiving side a character performs an action corresponding to the selected one. By adjusting settings of the communication software a character provided by the receiving side is caused to perform an action corresponding to "scissors", "paper" or "rock" randomly or in a predetermined sequence on the receiving side terminal having received a character message comprising the game of "scissors-paper-rock" from the transmitting side. The receiving side terminal or the administrator server can judge the victory or defeat based on a predetermined rule of the game of "scissors-paper-rock" and then transmits the outcome of the game such as "You win." or "I win" back to the transmitting side.

It is also conceivable that the communications system is used as a highly game-like application in which a character provided by a transmitting side fights with a character provided by a receiving side. In this case also, the receiving side terminal or the administrator server can judge the victory or defeat based on a predetermined decision condition and transmits the outcome of the game back.

Further, it is possible to impart advertisement of goods with a game property. For example, if a character provided by a user registered as a member of a manufacturer's group wins a game against a character transmitted from the manufacturer, the manufacturer sends its goods to the user in response to receipt of the outcome of the game. Since users can enjoy such advertisement, the advertisement utilizing the communications system is highly effective in sales promotion.

As has been described, the present invention provides the communications system that is capable of transmitting one's intention to a receiving side in diverse expression manners as well as of confirming that the receiving side has read the contents transmitted from the transmitting side. Further, the present invention provides various convenient functions that cannot be achieved by the prior art electronic mailing system.

While only certain presently preferred embodiments of the present invention have been described in detail, as will be apparent for those skilled in the art, certain changes and modifications may be made in embodiments without departing from the spirit and scope of the present invention as defined by the following claims.

What is claimed is:

1. A communications system, which is configured such that when a transmitting side transmits a character and its action designated by the transmitting side to a receiving side, the designated character performs the designated action on a screen on the receiving side, wherein when the receiving side receives character information for designating a character and action information for designating an action of the character, a file related to the action of the character is selected from information recorded on the receiving side and is executed; and wherein communications are performed via an administrator server and that when the receiving side is not ready to receive a character message that is transmitted from the transmitting side via the administrator server, the administrator server converts the text message into an electronic mail, attaches the character information and the action information to the electronic mail as attachments and transmits the electronic mail to the receiving side.

2. A communications system, which is configured such that when a transmitting side transmits a character and its action designated by the transmitting side to a receiving side, the designated character performs the designated action on a screen on the receiving side; and wherein when the receiving side receives character information for designating a character and action information for designating an action of the character, a file related to the action of the character is selected from information recorded on the receiving side and is executed; and wherein an image of the character displayed on the receiving side temporarily suspends action of the character while a text message is being displayed in a message box and then resumes its action after the message box is dismissed.

3. A communications system, which is configured such that when a transmitting side transmits a character message comprising character information for designating a character, action information for designating an action of the character and a text message to a receiving side, a screen on the receiving side having received the character message displays a motion picture of the character together with the text message; and wherein communications are performed via an administrator server and that when the receiving side is not ready to receive the character message that is transmitted from the transmitting side via the administrator server, the administrator server converts the text message into an electronic mail, attaches the character information and the action information to the electronic mail as attachments and transmits the electronic mail to the receiving side.

4. A communications system, which is conflaured such that when a transmitting side transmits a character message comprising character information for designating a character, action information for designating an action of the character and a text message to a receiving side, a screen on the receiving side having received the character message displays a motion picture of the character together with the text message; and wherein an image of the character displayed on the receiving side temporarily suspends its action of the character while the text message is being displayed in a message box and then resumes its action after the message box is dismissed.

* * * * *